(12) United States Patent
Nagata et al.

(10) Patent No.: US 12,088,952 B2
(45) Date of Patent: Sep. 10, 2024

(54) IMAGE PROCESSING APPARATUS, IMAGE PROCESSING METHOD, AND IMAGE PROCESSING SYSTEM

(71) Applicant: Sony Group Corporation, Tokyo (JP)

(72) Inventors: Koji Nagata, Tokyo (JP); Yasuhiro Yukawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/293,485

(22) PCT Filed: Dec. 10, 2019

(86) PCT No.: PCT/JP2019/048363
§ 371 (c)(1),
(2) Date: May 13, 2021

(87) PCT Pub. No.: WO2020/122084
PCT Pub. Date: Jun. 18, 2020

(65) Prior Publication Data
US 2022/0030178 A1    Jan. 27, 2022

(30) Foreign Application Priority Data

Dec. 11, 2018 (JP) .................................. 2018-232048

(51) Int. Cl.
*H04N 5/272*    (2006.01)
*B60R 1/00*    (2022.01)
(Continued)

(52) U.S. Cl.
CPC .............. *H04N 5/272* (2013.01); *B60R 1/26* (2022.01); *H04N 5/2628* (2013.01); *B60R 2300/304* (2013.01); *B60R 2300/8066* (2013.01)

(58) Field of Classification Search
None
See application file for complete search history.

(56) References Cited

U.S. PATENT DOCUMENTS

| 2007/0072154 A1 | 3/2007 | Akatsuka et al. |
| 2008/0231703 A1 | 9/2008 | Nagata et al. |

(Continued)

FOREIGN PATENT DOCUMENTS

| CN | 102714712 A | 10/2012 |
| CN | 104660985 A | 5/2015 |

(Continued)

OTHER PUBLICATIONS

International Search Report and Written Opinion dated Mar. 3, 2020, received for PCT Application PCT/JP2019/048363, Filed on Dec. 10, 2019, 11 pages including English Translation.

*Primary Examiner* — Rebecca A Volentine
(74) *Attorney, Agent, or Firm* — XSENSUS LLP

(57) ABSTRACT

Provision of a sense of distance by motion parallax and provision of various visual fields are satisfactorily realized. A display image is generated by superimposing a vehicle interior image on a captured image obtained by capturing an image on a rear side from a vehicle. The display image is generated on the basis of reference visual field setting information set by a setting unit. For example, the reference visual field setting includes a display position setting, a display size setting, a compression setting in all or part of a horizontal direction, a compression setting in all or part of a vertical direction, and the like. For example, the image showing the vehicle is a computer graphics image. For example, a change is made in a superimposed positional relationship between the captured image and the image showing the vehicle in accordance with motion of a viewpoint of a driver.

14 Claims, 33 Drawing Sheets

(51) Int. Cl.
*B60R 1/26* (2022.01)
*H04N 5/262* (2006.01)

(56) References Cited

U.S. PATENT DOCUMENTS

| | | |
|---|---|---|
| 2008/0239527 A1 | 10/2008 | Okabe et al. |
| 2012/0069187 A1 | 3/2012 | Ozaki |
| 2014/0340516 A1* | 11/2014 | Vojtisek ............... B60R 1/00 348/148 |
| 2015/0010207 A1 | 1/2015 | Inada et al. |
| 2016/0059781 A1* | 3/2016 | Tatara ................ H04N 7/181 348/148 |
| 2016/0288717 A1* | 10/2016 | Kameshima ........... B60K 35/00 |
| 2017/0282813 A1* | 10/2017 | Hashimoto ............ G08G 1/166 |
| 2017/0305345 A1* | 10/2017 | Hashimoto ...... H04N 5/232945 |
| 2018/0056870 A1* | 3/2018 | Kosugi ............. H04N 5/23296 |
| 2018/0285666 A1 | 10/2018 | Nishino |
| 2020/0369207 A1* | 11/2020 | Yoshida ................. H04N 7/18 |

FOREIGN PATENT DOCUMENTS

| | | |
|---|---|---|
| CN | 107284352 A | 10/2017 |
| CN | 107791949 A | 3/2018 |
| JP | 2002135765 A | 5/2002 |
| JP | 2004-287845 A | 10/2004 |
| JP | 2007-81590 A | 3/2007 |
| JP | 2009-100180 A | 5/2009 |
| JP | 2012-226665 A | 11/2012 |
| JP | 2013-216286 A | 10/2013 |
| JP | 2014036268 A | 2/2014 |
| JP | 2014072604 A | 4/2014 |
| JP | 2014-198531 A | 10/2014 |
| JP | 2015-201680 A | 11/2015 |
| JP | 2017-111739 A | 6/2017 |
| WO | 2014/130049 A1 | 8/2014 |
| WO | 2018/012299 A1 | 1/2018 |
| WO | WO-2018037789 A1 | 3/2018 |
| WO | WO-2018186086 A1 | 10/2018 |

\* cited by examiner

EXAMPLE OF REAR VISUAL FIELD

FIG. 22
(a) 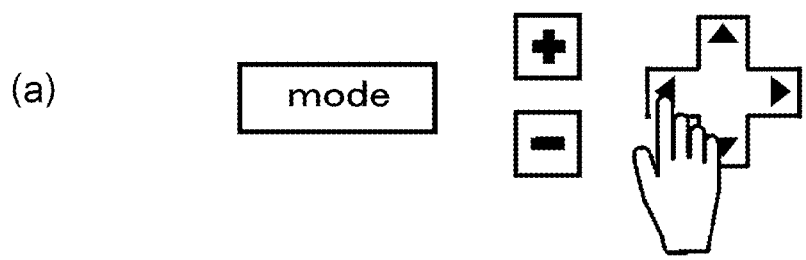
(b) 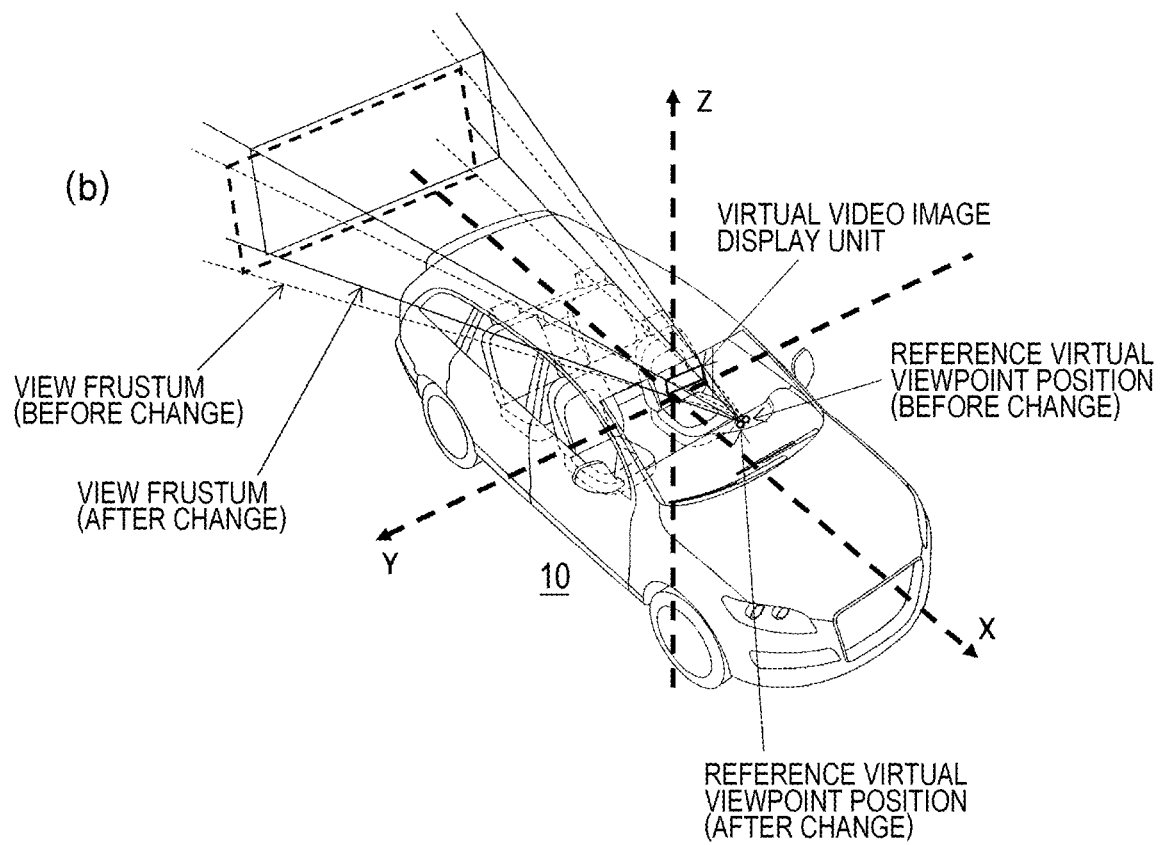

FIG. 23
(a) 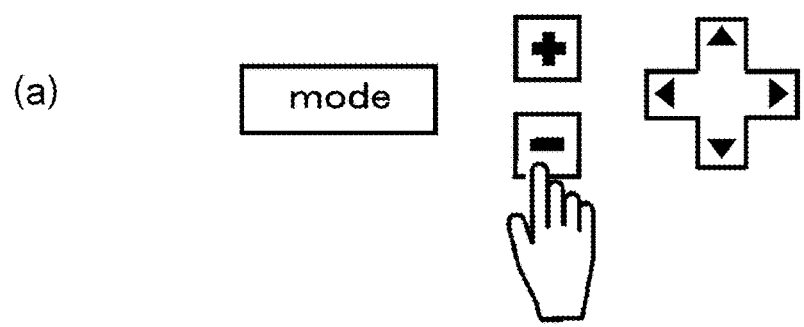
(b) 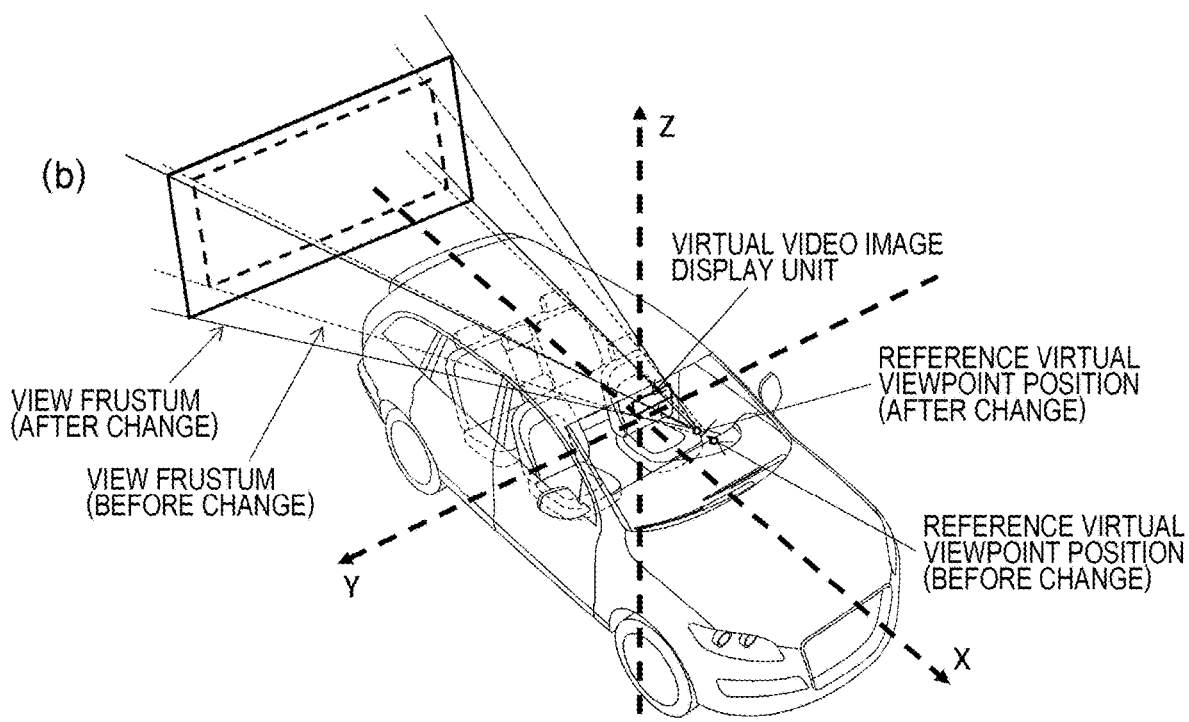

IMAGE PROCESSING APPARATUS, IMAGE PROCESSING METHOD, AND IMAGE PROCESSING SYSTEM

CROSS-REFERENCE TO RELATED APPLICATIONS

The present application is based on PCT filing PCT/JP2019/048363, filed Dec. 10, 2019, which claims priority to JP 2018-232048, filed Dec. 11, 2018, the entire contents of each are incorporated herein by reference.

TECHNICAL FIELD

The present technology relates to an image processing apparatus, an image processing method, and an image processing system, and more particularly to an image processing apparatus and the like suitable for applying to an in-vehicle electronic mirror.

BACKGROUND ART

Conventionally, in-vehicle electronic mirrors have been proposed in which rearview mirrors of vehicles (room mirrors and left and right door mirrors) are replaced with cameras and displays. For example, Patent Document 1 proposes a technique in which a range of a camera image to be displayed on a display is varied by using a relative position of the driver's head with respect to the display, in order to solve a difference of appearance in an electronic mirror from appearance in an actual mirror.

CITATION LIST

Patent Document

Patent Document 1: Japanese Patent Application Laid-Open No. 2013-216286

SUMMARY OF THE INVENTION

Problems to be Solved by the Invention

One of important information that the driver visually recognizes is a sense of distance obtained from motion parallax. When moving a viewpoint, humans perceive a distance to a body and a relative distance between bodies from a phenomenon that appearance and disappearance of the body change in accordance with a perspective position of the body. The technique proposed in Patent Document 1 cannot assist the above-described perception. Furthermore, the visual field suitable for driving varies depending on a driving situation, and there are also individual preferences.

An object of the present technology is to satisfactorily realize provision of a sense of distance by motion parallax and provision of various visual fields.

Solutions to Problems

A concept of the present technology is
an image processing apparatus including:
a processing unit configured to generate a display image by superimposing a vehicle interior image on a captured image obtained by capturing an image on a rear side from the vehicle, in which
the above-described processing unit generates the above-described display image on the basis of setting information regarding a reference visual field, and
the image processing system further includes:
a setting unit configured to set the above-described reference visual field.

In the present technology, the processing unit superimposes the vehicle interior image on the captured image obtained by capturing an image on a rear side from the vehicle, to generate the display image. In this case, the display image is generated on the basis of the setting information regarding the reference visual field. The reference visual field is set by the setting unit. For example, the reference visual field setting may include a display position setting. Furthermore, for example, the reference visual field setting may include a display size setting. Furthermore, for example, the reference visual field setting may include a compression setting of all or a part in a horizontal direction. Furthermore, for example, the reference visual field setting may include a compression setting of all or a part in a vertical direction.

As described above, in the present technology, the display image is obtained by superimposing the vehicle interior image on the captured image obtained by capturing an image on a rear side from the vehicle. In this case, since the display image is not only made from the captured image obtained by capturing an image on a rear side from the vehicle, but the display image is obtained by superimposing the image showing the vehicle on the captured image, it is possible to satisfactorily provide a sense of distance by motion parallax. Furthermore, the setting unit configured to set a reference visual field is provided. Therefore, it is possible to satisfactorily provide a visual field according to a driving situation or according to a preference of the driver (individual).

Note that, in the present technology, for example, the processing unit may be made to use, as a captured image obtained by capturing an image on a rear side from the vehicle, a captured image captured by an image capturing device attached to a rear part of the vehicle and a captured image captured by an image capturing device attached to a side part of the vehicle. This configuration widens an image capturing range of the captured image, which can increase a degree of freedom in setting in a display position setting, a display size setting, and the like as a visual field setting.

Furthermore, in the present technology, for example, a selection unit configured to select any reference visual field setting from a plurality of reference visual field settings may be further provided, and the processing unit may be made to generate a display image on the basis of the selected reference visual field setting. This configuration makes it possible to, for example, easily and immediately switch the visual field according to a change in a driving situation or the like.

Furthermore, in the present technology, for example, the vehicle interior image may be a computer graphics image. Using the computer graphics image allows a higher degree of freedom in generating the vehicle interior image.

Furthermore, in the present technology, for example, the processing unit may be made to change a superimposed positional relationship between the captured image and the vehicle interior image in accordance with motion of a viewpoint of the driver. This configuration can generate motion parallax that is close to that of looking at an actual rearview mirror, and can assist the driver's perception of between distances.

In this case, for example, the processing unit may be made to arrange the captured image and the image showing the vehicle in a three-dimensional space, obtain a virtual viewpoint position that changes in accordance with motion of a viewpoint of the driver, and convert the captured image and the image showing the vehicle into a projected coordinate system image with a visual field determined by the virtual viewpoint position, to obtain a display image. This configuration makes it possible to accurately change the superimposed positional relationship between the captured image and the image showing the vehicle, in accordance with motion of a viewpoint of the driver.

Then, in this case, for example, the processing unit may be made to arrange the captured image at a position of a predetermined object existing on a rear side from the vehicle. For example, the predetermined object may be an object closest to the vehicle, or an object being seen by the driver. By arranging the captured image at a position of the predetermined object existing on a rear side from the vehicle in this way, the predetermined object can be arranged with a proper size at a proper position in the three-dimensional space, and the motion parallax that occurs between the predetermined object and the vehicle interior image can be correctly expressed.

For example, the processing unit may be made to obtain a virtual viewpoint position that changes in accordance with motion of a viewpoint of the driver, on the basis of a reference viewpoint position and a reference virtual viewpoint position registered for each driver. This configuration makes it possible to obtain an optimum display image for each driver.

Furthermore, in the present technology, for example, the processing unit may be made to superimpose the vehicle interior image on the captured image to allow the captured image to be seen through. This configuration can prevent impairment of rear visibility even when the motion parallax is provided by superimposing the vehicle interior image.

BRIEF DESCRIPTION OF DRAWINGS

FIG. 22 is a view for explaining an example of an operation method of a display position in a reference visual field setting.

FIG. 23 is a view for explaining an example of a display size operation method, in the reference visual field setting.

MODE FOR CARRYING OUT THE INVENTION

Hereinafter, an embodiment for implementing the invention (hereinafter, referred to as an embodiment) will be described. Note that the description will be given in the following order.

1. Embodiment
2. Modified Example

1. Embodiment

[Component Arrangement of Vehicle]

Figure 1:
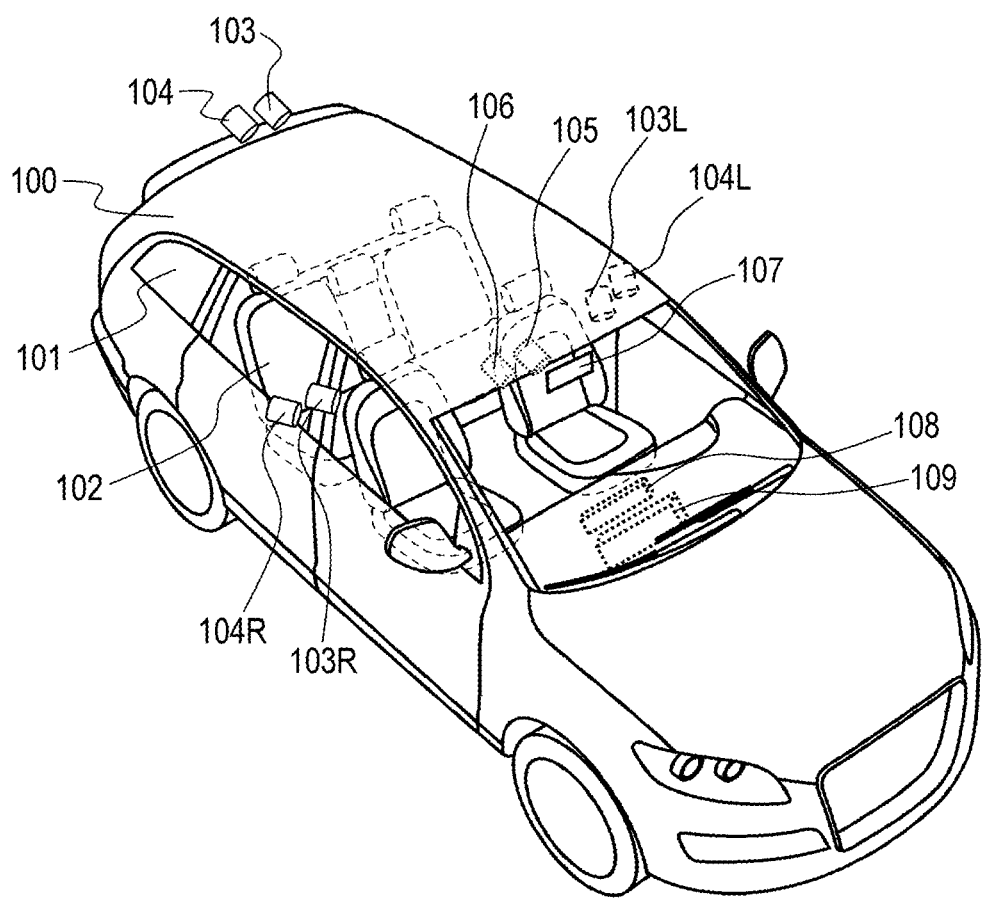
FIG. 1 is a view showing an example of component arrangement of a vehicle as an embodiment.
Figure 2:
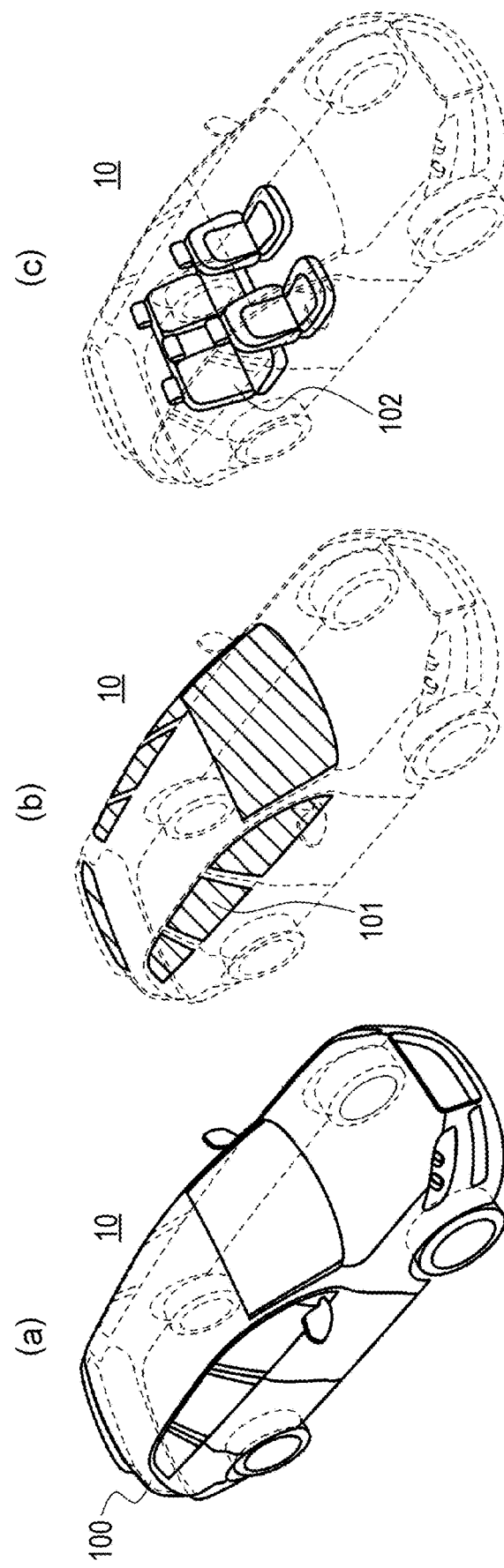
FIG. 2 is a view showing a vehicle body (a car body), a vehicle body opening (a window), and interior objects of a vehicle.

FIG. 1 shows an example of component arrangement of a vehicle 10 as an embodiment. The vehicle 10 has a vehicle body (a car body) 100, a vehicle body opening (a window) 101, and an interior object 102 such as a seat. FIG. 2(a) shows the vehicle body (the car body) 100, a hatched portion of FIG. 2(b) shows the vehicle body opening (the window) 101, and FIG. 2(c) shows the interior object 102 such as a seat.

Furthermore, the vehicle 10 has a center rear image capturing unit 103, a center rear distance measuring unit 104, a viewpoint measuring unit 105, and a line-of-sight measuring unit 106. The center rear image capturing unit 103 is configured by, for example, a complementary metal oxide semiconductor (CMOS) camera, and is attached to a rear-side outer shell of the vehicle 10 so as to capture an image on a rear side. The center rear distance measuring unit 104 includes, for example, a time of flight (ToF) distance image sensor, and is attached to a rear-side outer shell of the vehicle 10 so as to acquire a rear distance image.

Furthermore, the vehicle 10 has a right-side rear image capturing unit 103R, a right-side rear distance measuring unit 104R, a left-side rear image capturing unit 103L, and a left-side rear distance measuring unit 104L. The right-side rear image capturing unit 103R and the left-side rear image capturing unit 103L are each configured by, for example, a CMOS camera, and are attached to a side outer shell of the vehicle 10 so as to capture an image on a rear side. For example, it is conceivable to individually attach the right-side rear image capturing unit 103R and the left-side rear image capturing unit 103L to side mirror positions.

Furthermore, the right-side rear distance measuring unit 104R and the left-side rear distance measuring unit 104L are each configured by, for example, a ToF distance image sensor, and are attached to a side outer shell of the vehicle 10 so as to acquire a rear distance image. For example, it is conceivable to individually attach the right-side rear distance measuring unit 104R and the left-side rear distance measuring unit 104L to the side mirror positions.

The viewpoint measuring unit 105 detects a viewpoint position of a driver (a user). The viewpoint measuring unit 105 is attached inside on a front side of the vehicle 10. The viewpoint measuring unit 105 includes, for example, a CMOS camera, and measures a position of the driver's eye as the viewpoint position on the basis of a captured image of the camera. Note that the viewpoint measuring unit 105 may measure the viewpoint position of the driver on the basis of, for example, an image captured by an infrared camera. The line-of-sight measuring unit 106 detects a line-of-sight of the driver. The line-of-sight measuring unit 106 is attached inside on a front side of the vehicle 10. The line-of-sight measuring unit 106 includes, for example, a CMOS camera, and detects a line-of-sight of the driver, that is, where the driver is looking, on the basis of an image of the driver's pupil.

Furthermore, the vehicle 10 has a video image display unit (a display) 107, a user operation unit 108, and an image processing apparatus 109. The video image display unit 107 is attached inside on a front side of the vehicle 10 instead of a conventional room mirror, and has a substantially rectangular display surface. The video image display unit 107 includes a liquid crystal display (LCD), an organic electronic luminescent (EL) panel, and the like.

The user operation unit 108 constitutes a user interface that receives various operations by the driver. This user operation unit 108 includes, for example, a mechanical operation button arranged on an in-front panel, and further includes a touch panel arranged on a screen of the video image display unit 107, and the like. Note that, in the example of FIG. 1, the user operation unit 108 is shown to be arranged on an in-front panel, but the arrangement position of the user operation unit 108 is not limited to that position. The video image display unit 107 basically displays a rear image of the vehicle 10. However, in a case where a touch panel function is provided, the video image display unit 107 also displays a user interface (UI) for user operation, if necessary.

The image processing apparatus 109 performs processing for obtaining a display image to be displayed on the video image display unit 107. The image processing apparatus 109 is arranged at any location inside the vehicle 10, for example, in an in-front panel part as illustrated. The image processing apparatus 109 obtains a display image by superimposing and composing, with 3D CG, a vehicle interior image (a seat, a headrest, a window, a pillar, and the like) as an image showing the vehicle 10, on a camera image obtained by the center rear image capturing unit 103, the right-side rear image capturing unit 103R, the left-side rear image capturing unit 103L, and the like. In this way, the display image is not made only with the camera image, but the display image is obtained by superimposing the vehicle interior image on the camera image. Therefore, it is possible to easily provide a sense of distance by motion parallax.

In this case, the image processing apparatus 109 changes a superimposed positional relationship between the captured image and the vehicle interior image in accordance with motion of a viewpoint of the driver obtained by the viewpoint measuring unit 105. This configuration allows the driver to have motion parallax that is close to that of looking at an actual room mirror, and can assist the driver's perception of between distances.

The image processing apparatus 109 performs a setting on the display image on the basis of setting information regarding the reference visual field. The reference visual field setting includes a display position setting, a display size setting, a compression setting in all or part of a horizontal direction, a compression setting in all or part of a vertical direction, and the like. The driver (the user) can freely set the reference visual field by operating the user operation unit 108. This configuration makes it possible to provide a visual field according to a driving situation or according to a preference of the driver (individual).

[Configuration of Image Processing Apparatus]

Figure 3:
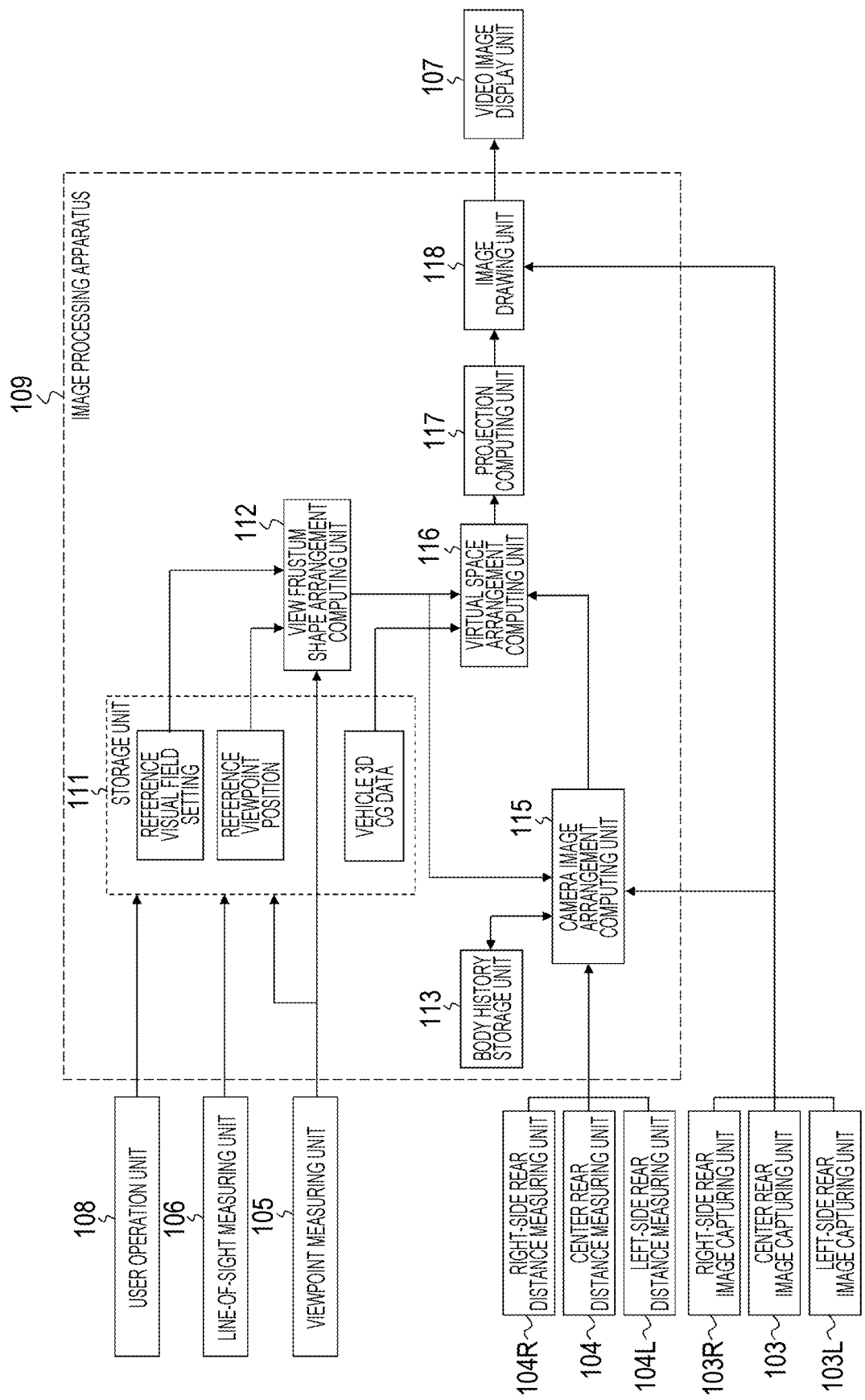
FIG. 3 is a block diagram showing a configuration example of an image processing apparatus.

FIG. 3 shows a configuration example of the image processing apparatus 109. The image processing apparatus 109 includes a storage unit 111, a view frustum shape position computing unit 112, a body history storage unit 113, a camera image arrangement computing unit 115, a virtual space arrangement computing unit 116, a projection computing unit 117, and an image drawing unit 118.

The image processing apparatus 109 arranges, in a virtual space, a camera image obtained by capturing an image on a rear side, and places the view frustum obtained on the basis of a virtual viewpoint position and a virtual video image display unit 107A, in addition to components to be subjected to image processing, that is, 3D CG data of the vehicle 10 (a car body, a window, an interior, and the like).

Figure 4:
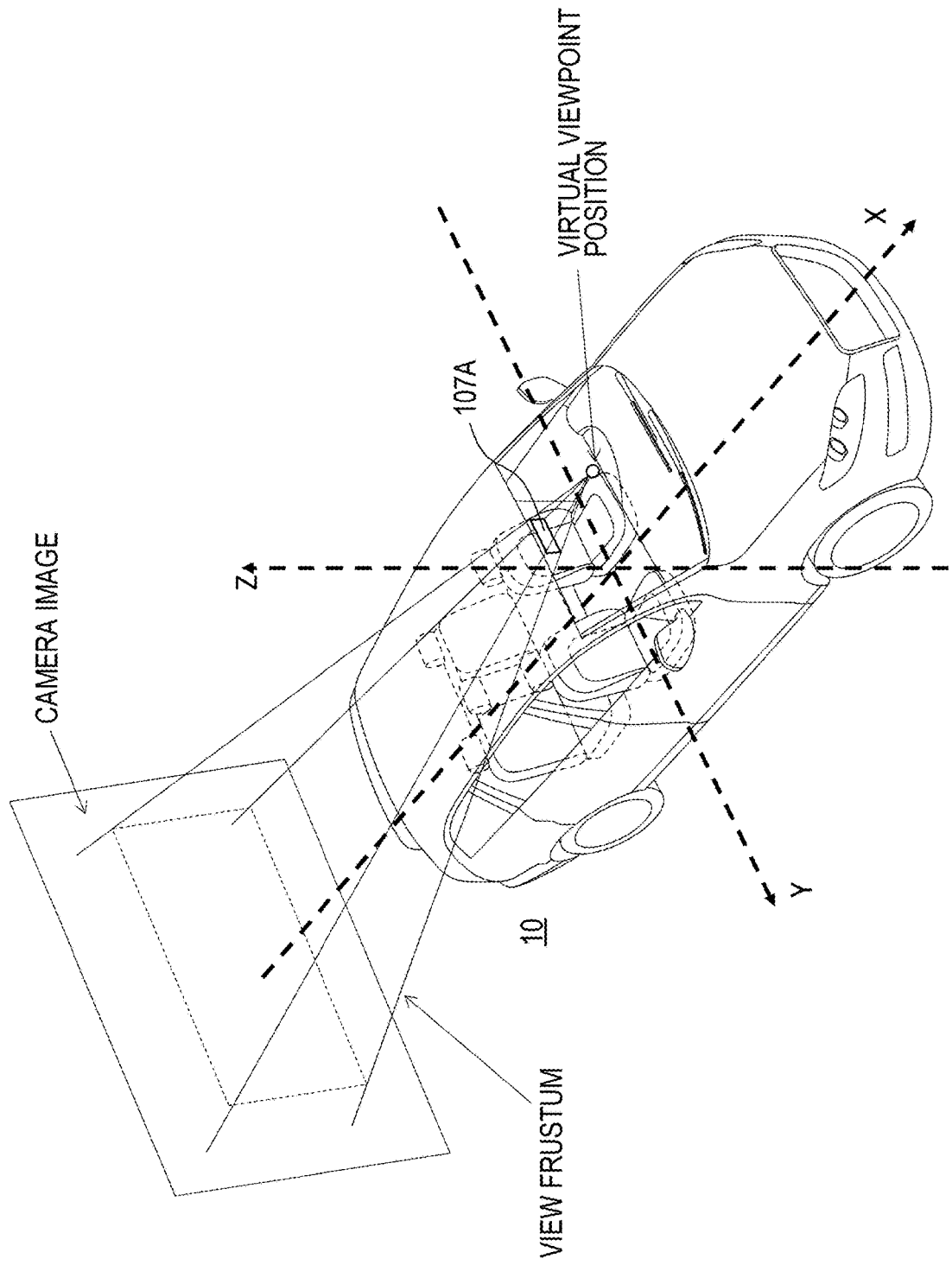
FIG. 4 is a view showing component arrangement (one camera) in a virtual space.
Figure 5:
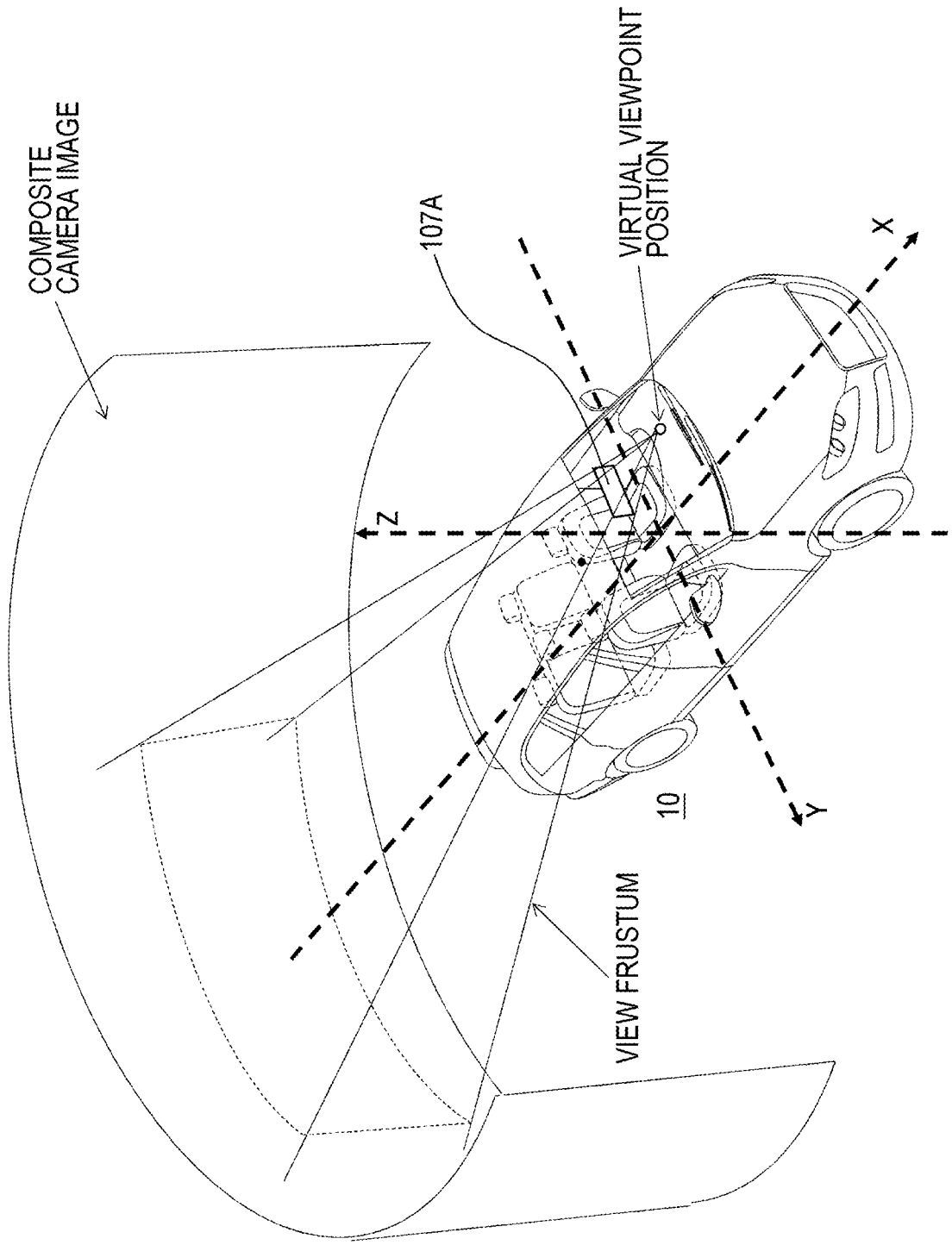
FIG. 5 is a view showing component arrangement (multiple cameras) in a virtual space.

FIG. 4 shows an example of component arrangement in a virtual space in a case where only one camera image is used, that is, only a camera image captured by the center rear image capturing unit 103 is used. Furthermore, FIG. 5 shows an example of component arrangement in a virtual space in a case of using multiple camera images, for example, a case of using two camera images by the center rear image capturing unit 103 and the right-side rear image capturing unit 103R; two camera images by the center rear image capturing unit 103 and the left-side rear image capturing unit 103L; or three camera images by the center rear image capturing unit 103, the right-side rear image capturing unit 103R, and the left-side rear image capturing unit 103L.

Here, the number of camera images to be used is determined by a region of a camera image included in the view frustum. For example, in a case where the view frustum includes only a region of a camera image of the center rear image capturing unit 103, only one camera image is used. Furthermore, for example, in a case where the view frustum includes a region of camera images of multiple rear image capturing units, multiple camera images are used. In a case of using multiple camera images, those camera images are composed to be used. In order to reduce distortion of a superimposed portion of multiple camera images, a camera image compositing surface has, for example, a cylindrical shape centered on the virtual video image display unit 107A.

The image processing apparatus 109 performs enlargement/reduction processing on an image generated with the view frustum as necessary, and outputs as a display image to be displayed on the video image display unit 107. Note that, in a case where a size of the virtual video image display unit 107A is the same as that of the video image display unit 107, the enlargement/reduction processing is not required.

Figure 6:
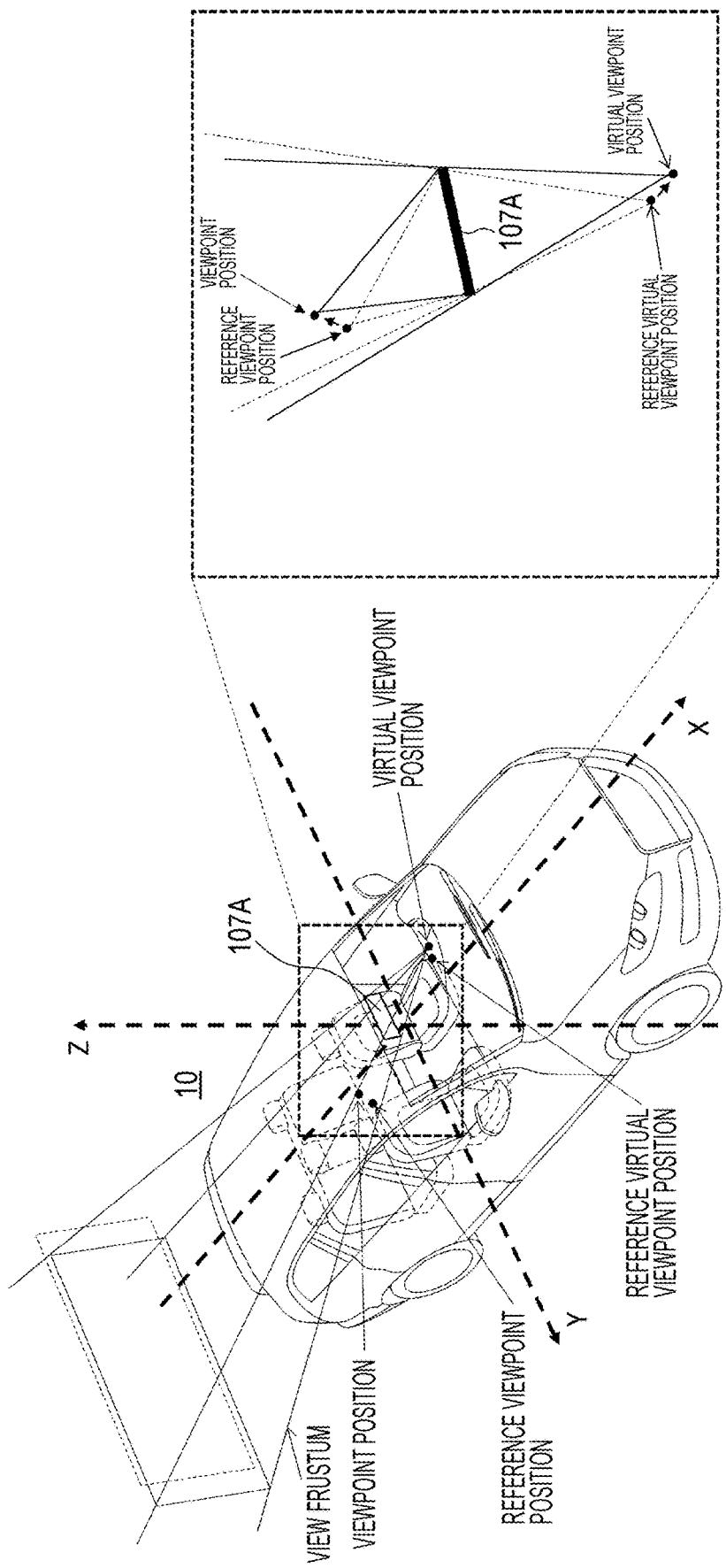
FIG. 6 is a view for explaining viewpoint motion and virtual viewpoint motion.

In this case, as shown in FIG. 6, the image processing apparatus 109 measures, as relative movement with respect to the reference viewpoint position, movement of a viewpoint position of the driver measured by the viewpoint measuring unit 105. In corresponding to this, the image processing apparatus 109 moves the virtual viewpoint position from a reference virtual viewpoint position, to change an image (a video image) displayed on the virtual video image display unit 107A and therefore the video image display unit 107, and provides the driver with appropriate motion parallax.

Returning to FIG. 3, the storage unit 111 stores information regarding a reference viewpoint position and a reference visual field setting registered for each driver, as well as the 3D CG data of the vehicle. Here, the reference visual field is a reference rear visual field, and means a visual field with the view frustum formed by the virtual viewpoint position and the virtual video image display unit 107A. Therefore, specifically, the information regarding the reference visual field setting includes information regarding the virtual viewpoint position, information regarding a position and a size of the virtual video image display unit 107A, and the like.

The driver can register the reference viewpoint position and the reference visual field setting in advance by an operation from the user operation unit 108. The image processing apparatus 109 reads information regarding the reference viewpoint position and the reference visual field setting from the storage unit 111 in the initialization flow, and uses the read information in a normal operation flow. Note that the driver can also change and adjust the setting of the reference visual field in the normal operation flow.

Figure 7:
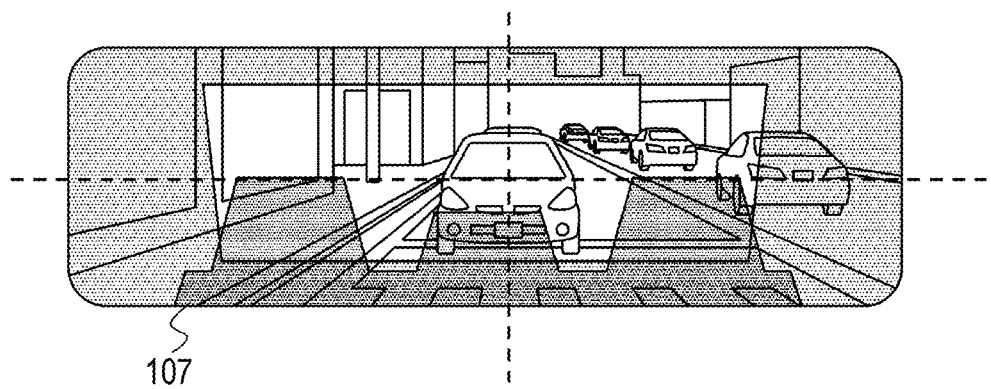
FIG. 7 is a view showing an example of appearance in an electronic mirror with a reference visual field.

A preferred rear visual field as the reference visual field varies depending on a driving situation and individuals, but a visual field in which top, bottom, left, and right are reflected in a well-balanced manner and a vanishing point is slightly above a center of the screen is considered as a general reference visual field. FIG. 7 shows an example of a rear visual field that is preferable as the reference visual field. In this example, the vanishing point is slightly above a center of the screen in a state of traveling on a straight horizontal road. Note that, in FIG. 7, an intersection point of broken lines extending in a vertical direction and a horizontal direction represents a center of the screen.

In this embodiment, the reference visual field setting includes a display position setting, a display size setting, a compression (curvature) setting of all or part in the horizontal direction, a compression (curvature) setting of all or part in the vertical direction, and the like. Details of the reference visual field setting will be described later.

The image processing apparatus 109 executes the initialization flow at a time of starting, for example, such as turning on power supply, specifies a driver (a user), and reads out information regarding the reference viewpoint position and the reference visual field setting corresponding to the driver from the storage unit 111 to use the information in the subsequent normal operation flow. The driver is specified by, for example, an operation from the user operation unit 108 by the driver. Note that, although detailed description is omitted, it is conceivable to automatically specify the driver by an authentication method such as face authentication, fingerprint authentication, or voice authentication, which are conventionally well known.

Figure 8:
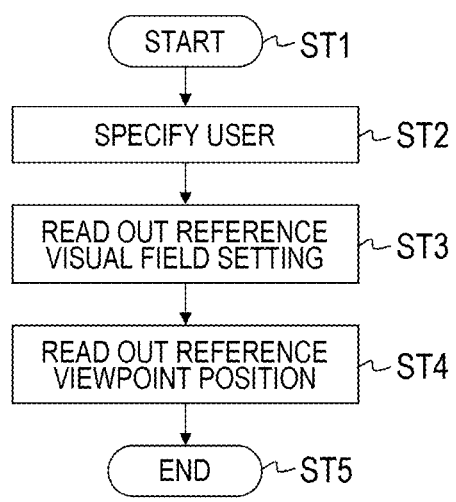
FIG. 8 is a flowchart showing an example of an initialization flow.

A flowchart of FIG. 8 shows an example of the initialization flow. In step ST1, the image processing apparatus 109 starts processing. Next, in step ST2, the image processing apparatus 109 specifies the user, that is, the driver. Next, in step ST3, the image processing apparatus 109 reads out information regarding a reference visual field setting of the specified driver from the storage unit 111. Next, in step ST3, the image processing apparatus 109 reads out information regarding a reference viewpoint position of the specified driver from the storage unit 111. Then, the image processing apparatus 109 ends a series of processing of the initialization flow in step ST5.

Figure 9:
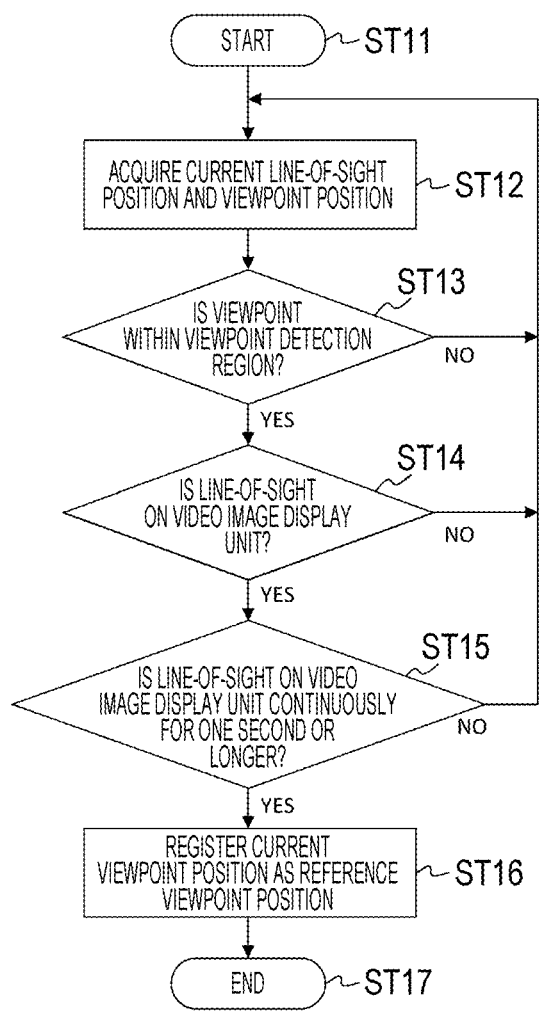
FIG. 9 is a flowchart showing an example of a registration flow for a reference viewpoint position.

A flowchart of FIG. 9 shows an example of a registration flow for the reference viewpoint position. In step ST11, the image processing apparatus 109 starts processing. Next, in step ST12, the image processing apparatus 109 acquires a current viewpoint position of the driver on the basis of a detection result of the viewpoint measuring unit 105, and also acquires a current line-of-sight position of the driver on the basis of a detection result of the line-of-sight measuring unit 106.

Figure 10:
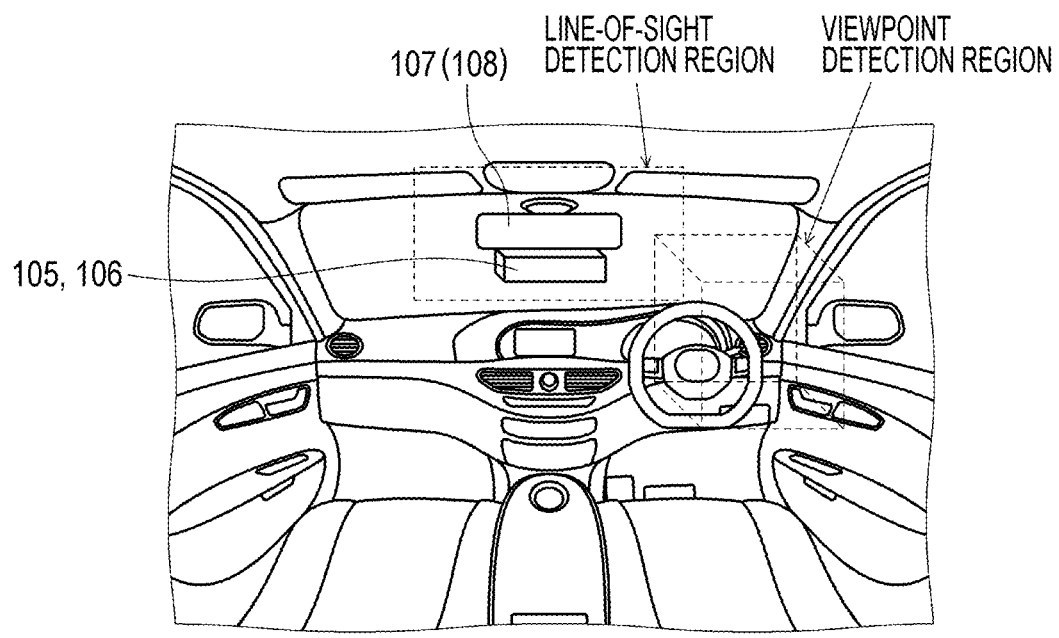
FIG. 10 is a view showing an example of a viewpoint detection region and a line-of-sight detection region.

Next, in step ST13, the image processing apparatus 109 determines whether or not the viewpoint is within a viewpoint detection region (see FIG. 10). When the viewpoint is not within the viewpoint detection region, the image processing apparatus 109 returns to the processing of step ST12. Whereas, when the viewpoint is within the viewpoint detection region, the image processing apparatus 109 determines in step ST14 whether or not the line-of-sight is on the video image display unit 107 in a line-of-sight detection region (see FIG. 10). When the line-of-sight is not on the video image display unit 107, the image processing apparatus 109 returns to the processing of step ST12. Whereas, when the line-of-sight is on the video image display unit 107, the image processing apparatus 109 shifts to the processing of step ST15.

In step ST15, the image processing apparatus 109 determines whether or not the line-of-sight is continuously present on the video image display unit 107 for a certain period of time or longer, here for one second or longer. When the line-of-sight is not on the video image display unit 107 continuously present for one second or longer, the image processing apparatus 109 returns to the processing of step ST12. Whereas, when the line-of-sight is continuously present for one second or longer on the video image display unit 107, in step ST16, the image processing apparatus 109 registers a current viewpoint position as the reference viewpoint position in the storage unit 111 in association with the driver. Thereafter, in step ST17, the image processing apparatus 109 ends a series of processing.

Returning to FIG. 3, the view frustum shape position computing unit 112 calculates a shape and a position of the view frustum in the virtual space, on the basis of information regarding the reference viewpoint position and the reference visual field setting read from the storage unit 111, and the current viewpoint position detected by the viewpoint measuring unit 105. In this case, a virtual viewpoint position (a current virtual viewpoint position) deviated from the reference virtual viewpoint position is obtained (see FIG. 6) in accordance with a deviation (a deviation in a distance or a direction) of the viewpoint position (the current viewpoint position) from the reference viewpoint position. Further, on the basis of this virtual viewpoint position and the size and the position of the virtual video image display unit 107A, a position and a shape of the view frustum with the virtual viewpoint as an apex are obtained (see FIGS. 4 and 5).

The camera image arrangement computing unit 115 calculates an arrangement distance of a camera image in the virtual space on the basis of: a rear distance image acquired by the right-side rear distance measuring unit 104R, the center rear distance measuring unit 104, and the left-side rear distance measuring unit 104L; a rear camera image acquired by the right-side rear image capturing unit 103R, the center rear image capturing unit 103, and the left-side rear image capturing unit 103L; the shape and the position of the view frustum obtained by the view frustum shape arrangement computing unit 112; and the like.

Depending on this arrangement position of the camera image, appearance (motion parallax) of a subject that is shown in the camera image and appears and disappears in a vehicle interior image (the car body, the window, the interior) differs when the driver moves the viewpoint position. In order to provide appropriate motion parallax, it is necessary to place the camera image at an appropriate position in the virtual space.

Figure 11:
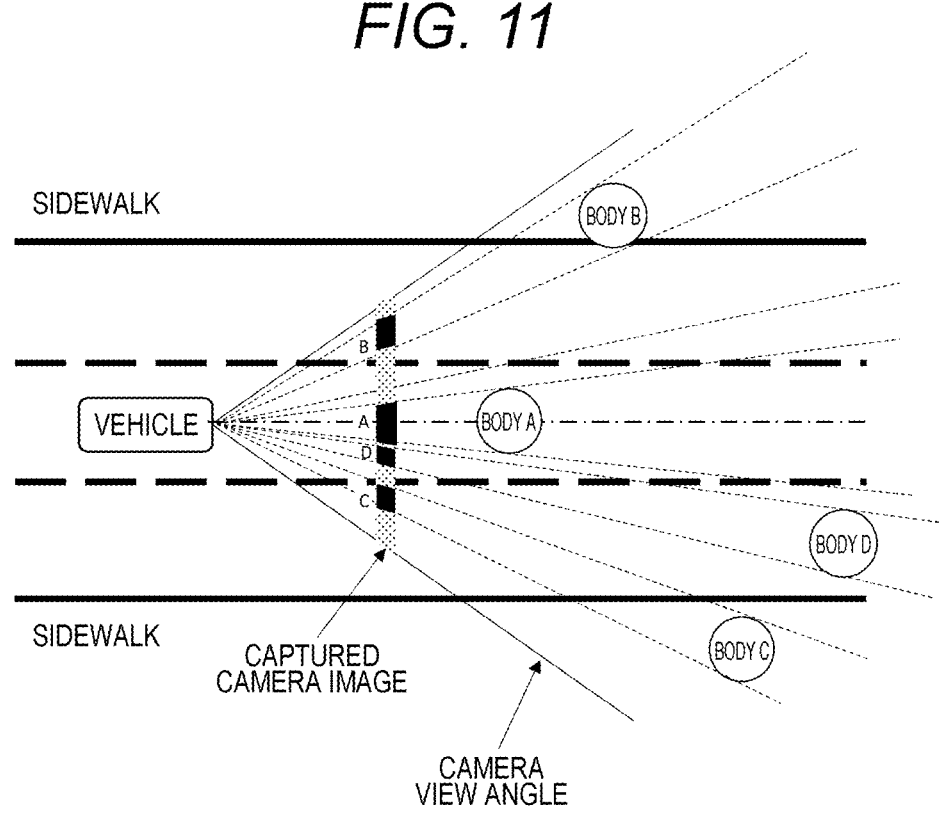
FIG. 11 is a view for explaining a captured camera image.

As shown in FIG. 11, an image actually captured by the camera is obtained by compressing a three-dimensional space in a distance direction, and bodies (objects) A to D at different distances are captured as a two-dimensional image in a size corresponding to the distance. Therefore, it is not perfectly appropriate by placing this camera image anywhere in a three-dimensional space, and a proper position can be obtained only for bodies that are at a distance where the camera image is placed. Note that, actually, an image outside a depth of field of a camera lens is blurred, but here, it is considered as an ideal pan-focus camera.

Figure 12:
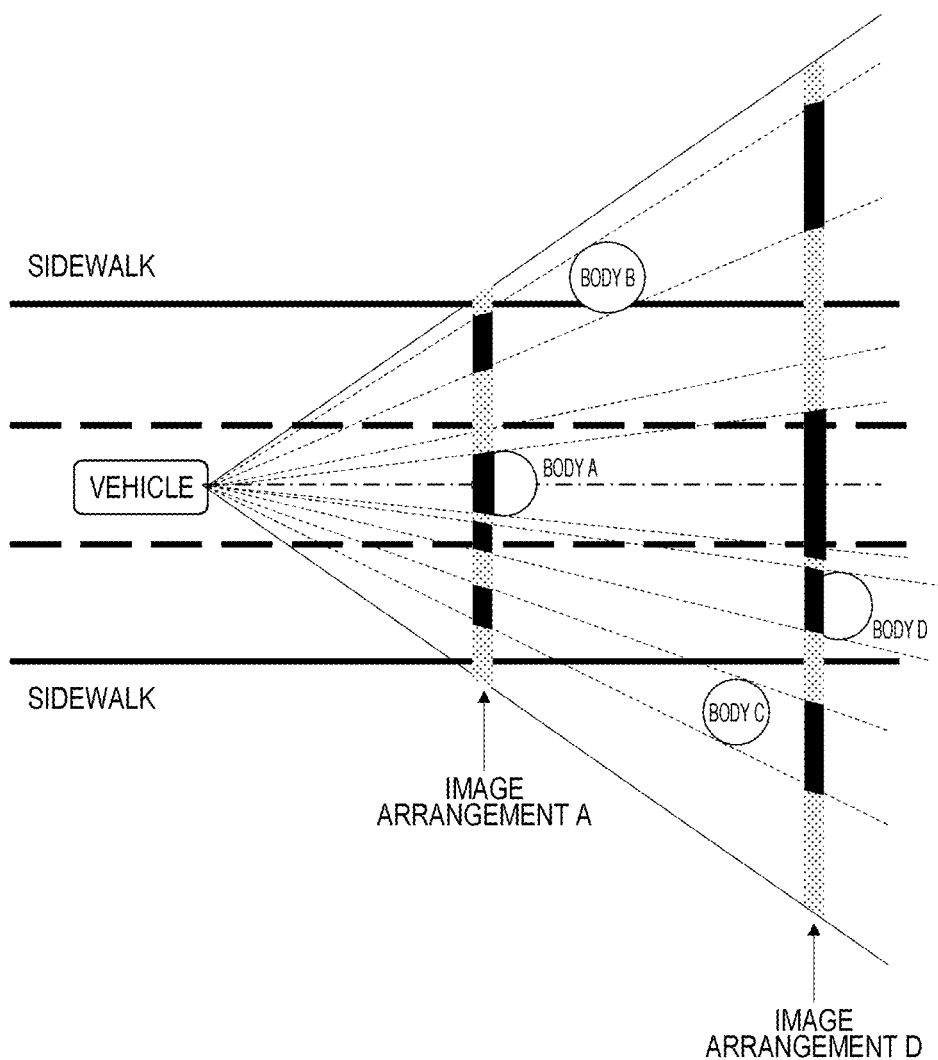
FIG. 12 is a view showing an arrangement example of a camera image.

FIG. 12 shows a case where the camera image is placed at a distance of the body A (image arrangement A) and a case where the camera image is placed at a distance of the body D (image arrangement D). Then, FIGS. 13(a), 13(b), and 13(c) show a sight in a case where a visual field (corresponding to a view frustum determined by the virtual viewpoint position) is moved to the right, the center, and the left, respectively.

Figure 13:
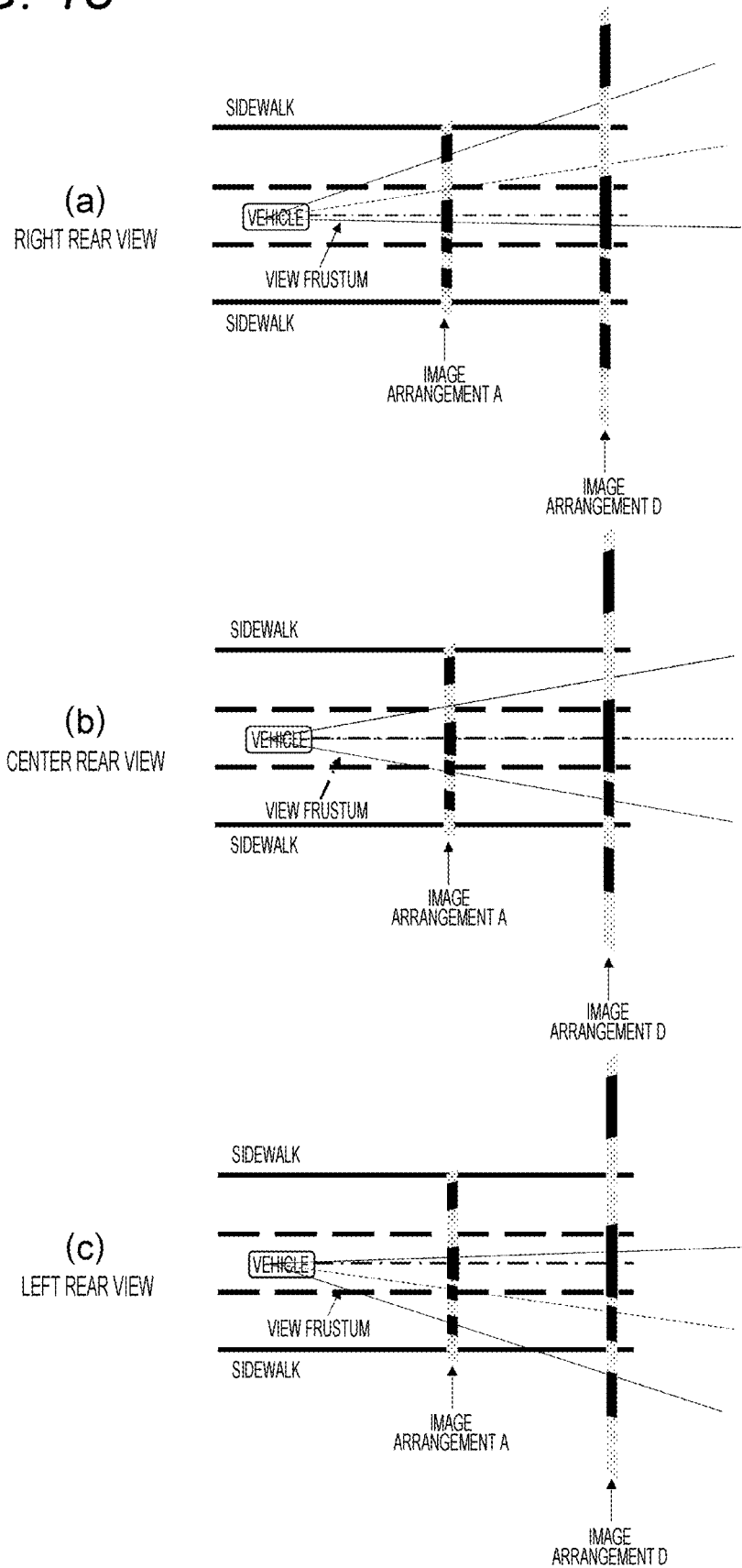
FIG. 13 is a view showing a change in appearance of a camera image due to a difference in arrangement of the camera image.

Comparing FIGS. 13(a), 13(b), and 13(c), a range of the camera image that enters the visual field differs between the case of image arrangement A and the case of image arrangement D. Further, it can be seen that a range of movement in the camera image differs in accordance with motion of the visual field. This is the motion parallax for a body in the camera image. By placing the camera image at a distance of a body (an object) of interest, the motion parallax that occurs between the body and the vehicle can be correctly expressed.

It should be noted that, for bodies other than the body of interest, a displayed size and motion parallax caused by the viewpoint motion are not correctly expressed. In order to provide proper motion parallax for all bodies, it is necessary to capture an image on a rear side in 3D, and separate all bodies to place in the virtual space. However, such processing requires a great deal of calculation power.

The present technology has a feature of providing motion parallax for the body of interest with a relatively small amount of calculation, by giving up the motion parallax other than the body of interest.

In order to present a useful sense of distance by the limited motion parallax, it is necessary to select a body of interest suitable for presenting the sense of distance to the driver. The followings are events to consider when selecting the body suitable for presenting a sense of distance.

(1) A distance between the vehicle and a body (a body closest to the vehicle).

(2) A change in distance between the vehicle and the body (whether it is approaching or moving away).

(3) A size of the body (It is not necessary to pay attention to bodies whose size is smaller than a certain level Ex. insects).

(4) What the body is (a car, a bicycle, a person, a wall, or a plant).

(5) Thing the driver is looking at (where the driver is looking)

Figure 14:
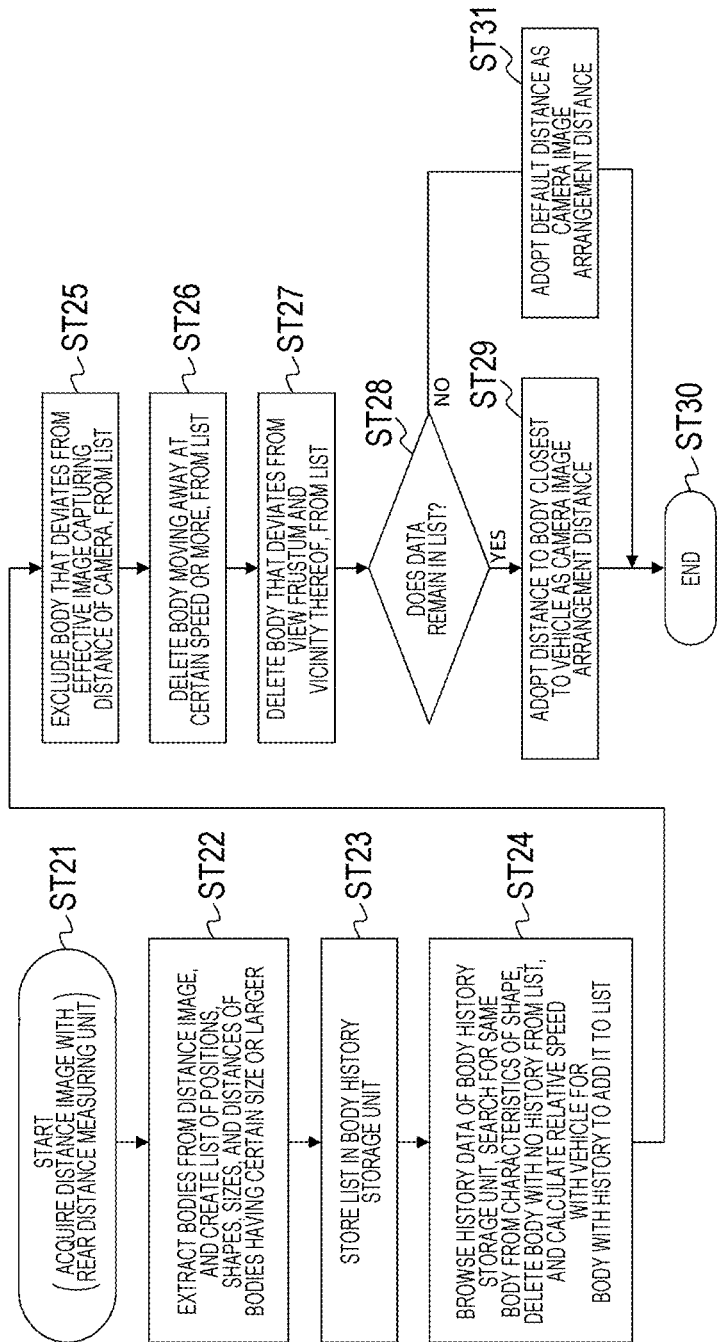
FIG. 14 is a flowchart showing an example of a processing flow of a camera image arrangement computing unit.

Ideally, comprehensive determination should be made in consideration of all of these, but it is possible to provide a useful system even with only some events. A flowchart of FIG. 14 shows an example of a processing flow of the camera image arrangement computing unit 115. This processing example takes into consideration of the above-mentioned events (1), (2), and (3), and can be realized by using only a distance image acquired by the rear distance measuring unit (the right-side rear distance measuring unit 104R, the center rear distance measuring unit 104, and the left-side rear distance measuring unit 104L).

The camera image arrangement computing unit 115 executes the processing flow shown in the flowchart of FIG. 14 every time the rear distance measuring unit acquires a distance image. Note that the rear distance measuring unit acquires the distance image at a frequency of, for example, 120 fps.

In step ST21, the camera image arrangement computing unit 115 starts processing at a timing when the rear distance measuring unit acquires the distance image. Next, in step ST22, the camera image arrangement computing unit 115 extracts bodies (object) from the distance image, and creates a list of positions, shapes, sizes, and distances of bodies having a certain size or larger. Then, in step ST23, the camera image arrangement computing unit 115 stores the created list in the body history storage unit 113.

Next, in step ST24, the camera image arrangement computing unit 115 browses history data of the body history storage unit 113, searches for the same body from the characteristics of the shape, deletes a body with no history from the list, and calculates a relative speed with the vehicle for a body with a history to add to the list.

Next, in step ST25, the camera image arrangement computing unit 115 excludes a body that deviates from an effective image capturing distance of the camera, from the created list. This is intended to remove bodies that are at a distance that the camera is out of focus. If the camera image cannot be captured even if the distance can be measured, the body is inappropriate for a camera image arrangement distance and is excluded.

Next, in step ST26, the camera image arrangement computing unit 115 deletes a body moving away at a certain speed or more, from the list. Next, in step ST27, the camera image arrangement computing unit 115 deletes a body that deviates from the view frustum and vicinity thereof, from the list. Then, in step ST28, the camera image arrangement computing unit 115 determines whether or not data remains in the list.

When data remains in the list, in step ST29, the camera image arrangement computing unit 115 adopts a distance to a body closest to the vehicle, as the camera image arrangement distance. After the processing in step ST29, the camera image arrangement computing unit 115 ends a series of processing in step ST30.

Furthermore, when no data remains in the list in step ST28, a predetermined default distance is adopted as the camera image arrangement distance in step ST31. Here, the default distance is a distance suitable for arranging a distant view. In presenting a sense of distance, it is desirable to be as far as computing power allows. However, in reality, for example, a default distance is determined with reference to computing power of the center rear distance measuring unit 104. For example, the default distance may be about 100 m for a light detection and ranging (LiDAR), and about 250 m for ToF sensor. After the processing in step ST31, the camera image arrangement computing unit 115 ends the series of processing in step ST30.

Figure 15:
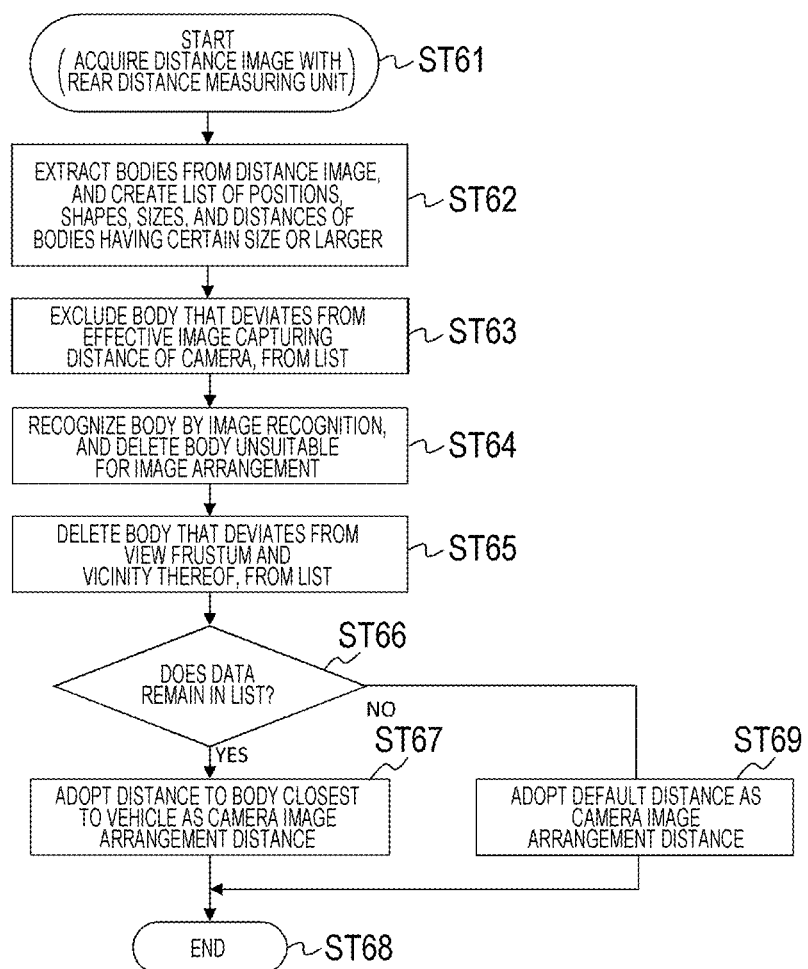
FIG. 15 is a flowchart showing another example of the processing flow of the camera image arrangement computing unit.

A flowchart of FIG. 15 shows another example of the processing flow of the camera image arrangement computing unit 115. This processing example takes into consideration of the above-mentioned events (1), (3), and (4), and can be realized by using a camera image obtained by the center rear image capturing unit 103, in addition to a distance image acquired by the rear distance measuring unit.

The camera image arrangement computing unit 115 executes the processing flow shown in the flowchart of FIG. 15 every time the rear distance measuring unit acquires a distance image. Note that the rear distance measuring unit acquires the distance image at a frequency of, for example, 120 fps.

In step ST61, the camera image arrangement computing unit 115 starts processing at a timing when the rear distance measuring unit acquires the distance image. Next, in step ST62, the camera image arrangement computing unit 115 extracts bodies from the distance image, and creates a list of positions, shapes, sizes, and distances of bodies having a certain size or larger.

Next, in step ST63, the camera image arrangement computing unit 115 excludes a body that deviates from an effective image capturing distance of the camera, from the created list. This is intended to remove bodies that are at a distance that the camera is out of focus. If the camera image cannot be captured even if the distance can be measured, the body is inappropriate for a camera image arrangement distance and is excluded.

Next, in step ST64, the camera image arrangement computing unit 115 recognizes a body by image recognition, and deletes a body unsuitable for image arrangement (for example, a bird, a dead leaf, and the like) from the list. Next, in step ST65, the camera image arrangement computing unit 115 deletes a body that deviates from the view frustum and vicinity thereof, from the list. Then, in step ST66, the camera image arrangement computing unit 115 determines whether or not data remains in the list.

When data remains in the list, in step ST67, the camera image arrangement computing unit 115 adopts a distance to a body closest to the vehicle, as the camera image arrangement distance. After the processing in step ST67, the camera image arrangement computing unit 115 ends a series of processing in step ST68.

Furthermore, when no data remains in the list in step ST66, a predetermined default distance (a distance suitable for arranging a distant view) is adopted as the camera image arrangement distance in step ST69. After the processing in step ST69, the camera image arrangement computing unit 115 ends the series of processing in step ST68.

Figure 16:
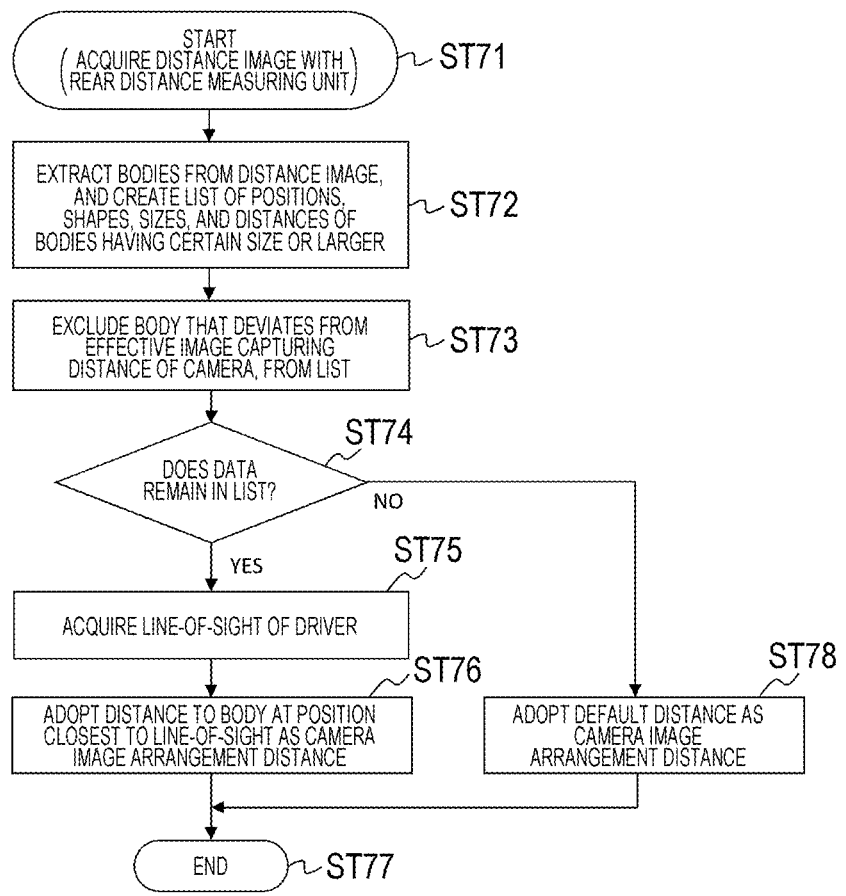
FIG. 16 is a flowchart showing another example of the processing flow of the camera image arrangement computing unit.

A flowchart of FIG. 16 shows still another example of the processing flow of the camera image arrangement computing unit 115. This processing example takes into consideration of the above-mentioned events (1), (3), and (5), and can be realized by using a line-of-sight detection result of the driver (the user) by the line-of-sight measuring unit 106, in addition to a distance image acquired by the rear distance measuring unit.

The camera image arrangement computing unit 115 executes the processing flow shown in the flowchart of FIG. 16 every time the rear distance measuring unit acquires a distance image. Note that the rear distance measuring unit acquires the distance image at a frequency of, for example, 120 fps.

In step ST71, the camera image arrangement computing unit 115 starts processing at a timing when the rear distance measuring unit acquires the distance image. Next, in step ST72, the camera image arrangement computing unit 115 extracts bodies from the distance image, and creates a list of positions, shapes, sizes, and distances of bodies having a certain size or larger.

Next, in step ST73, the camera image arrangement computing unit 115 excludes a body that deviates from an effective image capturing distance of the camera, from the created list. Then, in step ST74, the camera image arrangement computing unit 115 determines whether or not data remains in the list.

When data remains in the list, in step ST75, the camera image arrangement computing unit 115 acquires a line-of-sight of the driver (the user) obtained by the line-of-sight measuring unit 106. Then, in step ST76, the camera image arrangement computing unit 115 adopts a distance of a body at a position closest to the line-of-sight, as the camera image arrangement distance. After the processing in step ST76, the camera image arrangement computing unit 115 ends a series of processing in step ST77.

Furthermore, when no data remains in the list in step ST74, a predetermined default distance (a distance suitable for arranging a distant view) is adopted as the camera image arrangement distance in step ST78. After the processing in step ST78, the camera image arrangement computing unit 115 ends the series of processing in step ST77.

Figure 17:
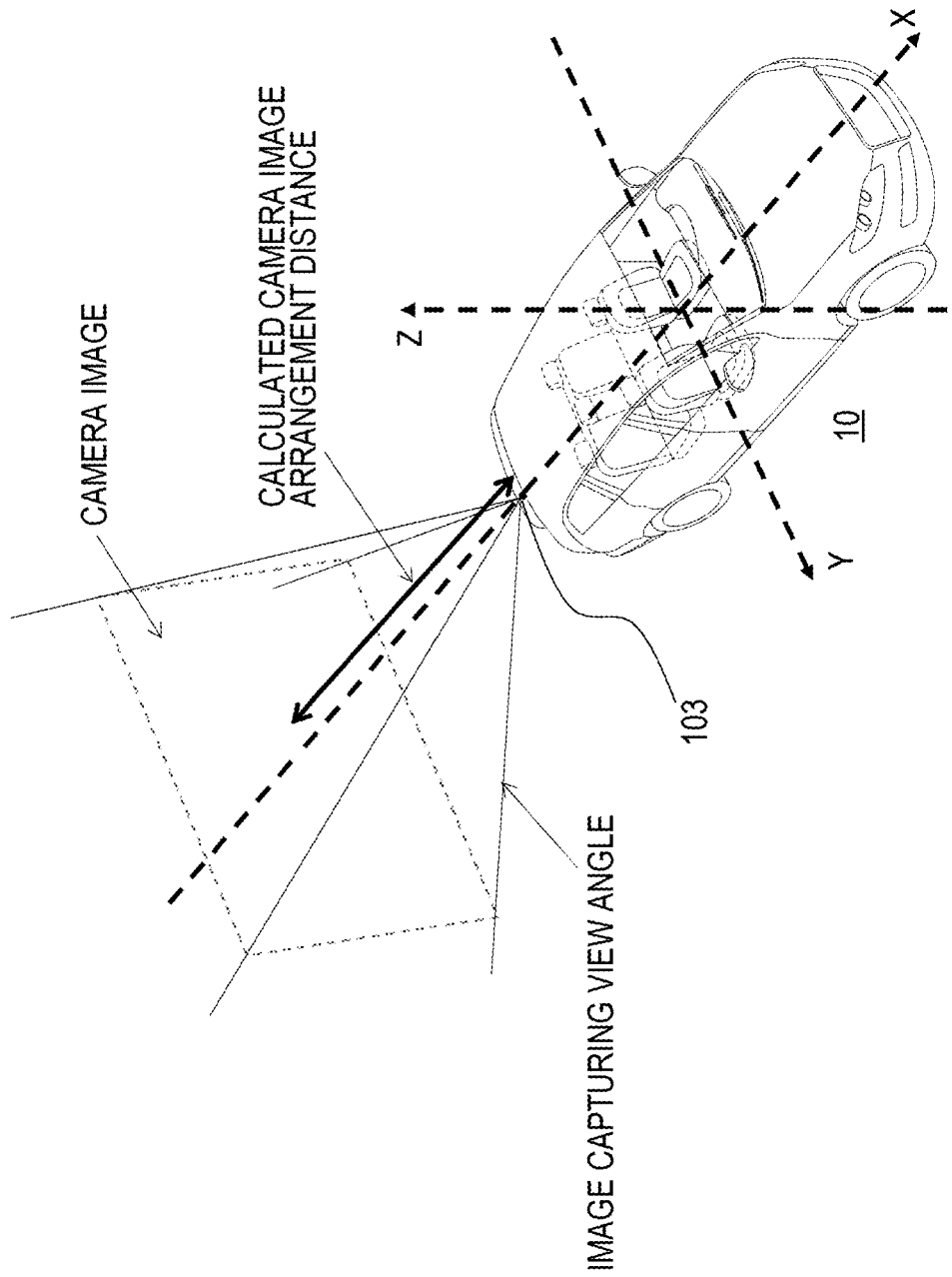
FIG. 17 is a view showing camera image arrangement (one camera image is used) in a virtual space.

FIG. 17 shows an arrangement position of a camera image in a case where only one camera image is used, that is, only a camera image captured by the center rear image capturing unit 103 is used. The camera image has been obtained by capturing with the center rear image capturing unit 103 at a predetermined image capturing view angle. This camera image is arranged in the virtual space at a position separated from a rear part of the vehicle 10, by a camera image arrangement distance calculated by the camera image arrangement computing unit 115. Note that, in a case of using only the center rear image capturing unit 103 in this way, the camera image arrangement computing unit 115 uses the distance image obtained by the center rear distance measuring unit 104 when calculating the camera image arrangement distance as described above, to calculate a camera image arrangement distance from a rear part of the vehicle 10 (the rear distance measuring unit 104).

Figure 18:
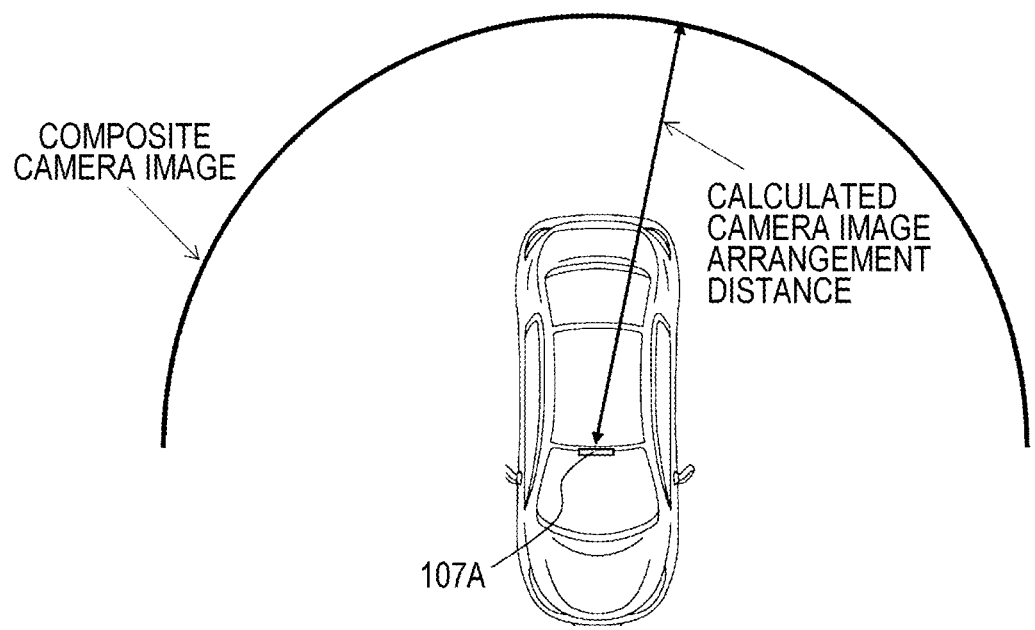
FIG. 18 is a view showing camera image arrangement (multiple camera images are used) in a virtual space.

FIG. 18 shows an arrangement position of a composite camera image in a case of using multiple camera images, for example, in a case of using two camera images by the center rear image capturing unit 103 and the right-side rear image capturing unit 103R; two camera images by the center rear image capturing unit 103 and the left-side rear image capturing unit 103L; or three camera images by the center rear image capturing unit 103, the right-side rear image capturing unit 103R, and the left-side rear image capturing unit 103L.

In this case, a rear distance image can be obtained from each of the corresponding plurality of rear distance measuring units. Since those distance images are distances measured separately, they are composed into a distance image centered on the virtual video image display unit 107A. The composite camera image is arranged in the virtual space at a position separated from the virtual video image display unit 107A, by the camera image arrangement distance calculated by the camera image arrangement computing unit 115. Note that, in a case of using multiple cameras in this way, the camera image arrangement computing unit 115 uses a composite of the distance images of multiple rear distance measuring units when calculating the camera image arrangement distance as described above, to calculate camera image arrangement distance from the virtual video image display unit 107A.

Returning to FIG. 3, the virtual space arrangement computing unit 116 arranges elements necessary for drawing in the virtual space. That is, the virtual space arrangement computing unit 116 arranges, in the virtual space, 3D CG data of the vehicle 10 (a car body, a window, an interior, and the like) stored in the storage unit 111. The virtual space arrangement computing unit 116 also arranges the camera image at a position of the camera image arrangement distance calculated by the camera image arrangement computing unit 115, and further arranges a view frustum on the basis of a shape and a position calculated by the view frustum shape arrangement computing unit 112.

Figure 19:
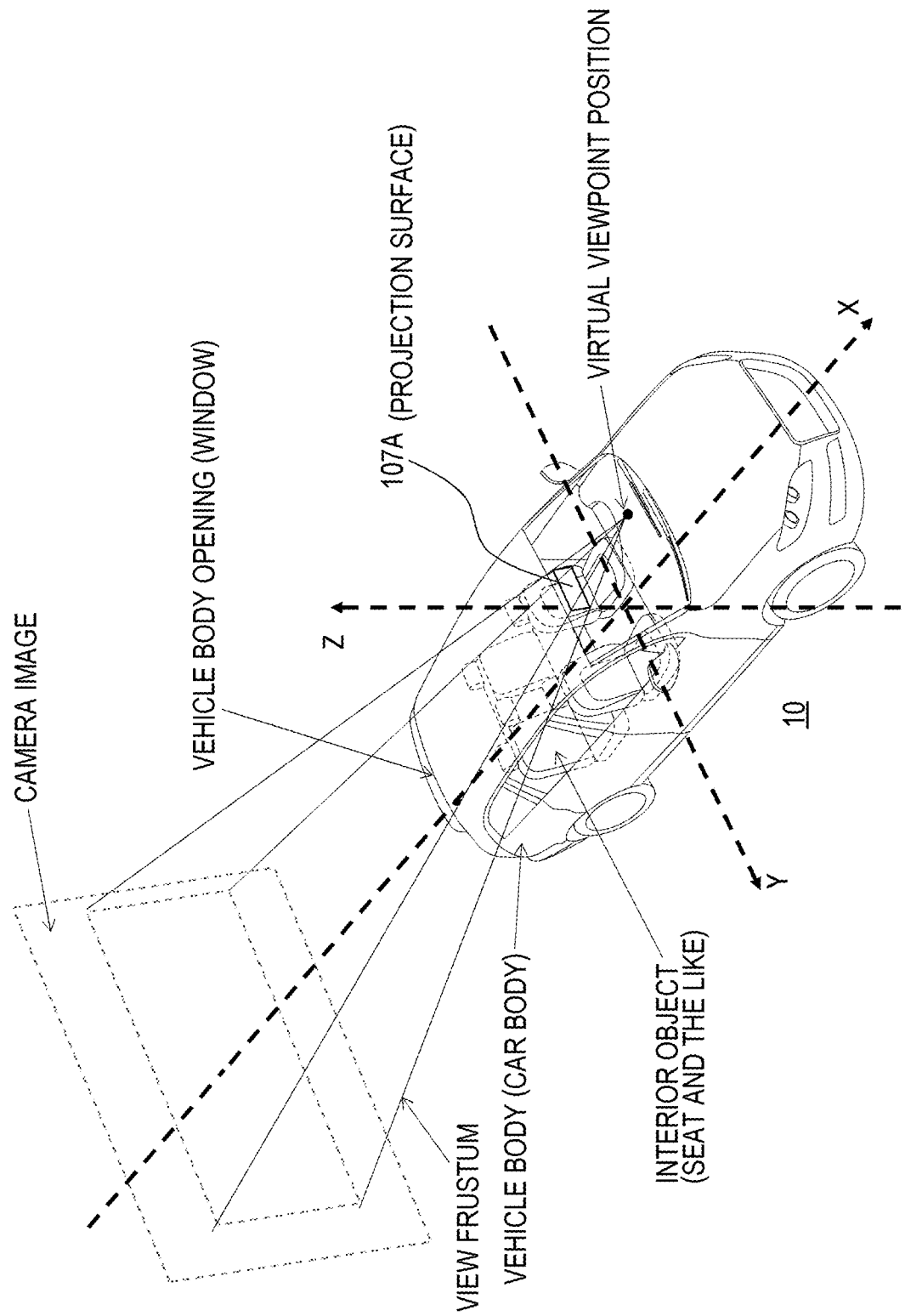
FIG. 19 is a view showing an arrangement example (one camera image is used) of elements necessary for drawing in a virtual space.
Figure 20:
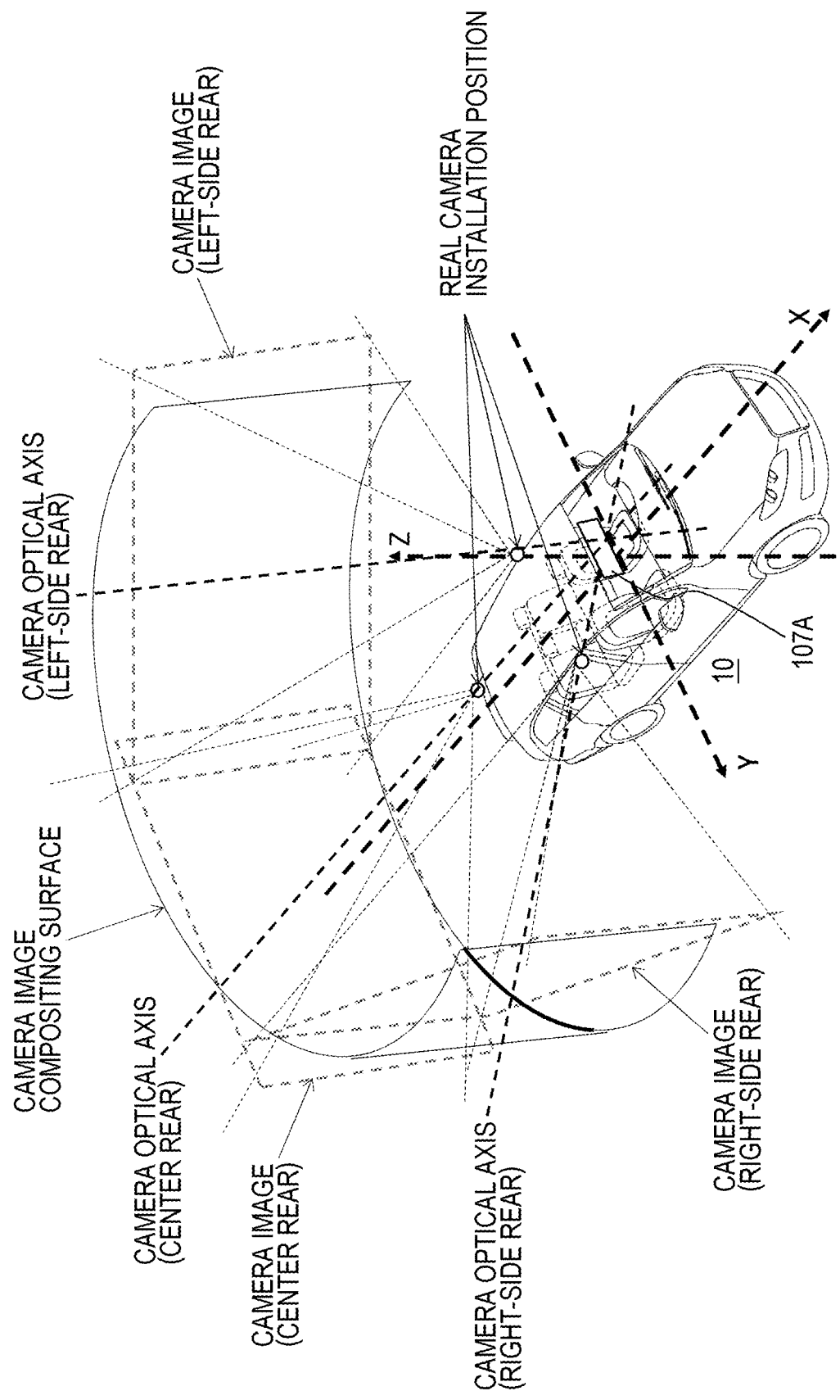
FIG. 20 is a view showing an arrangement example (multiple camera images are used) of elements necessary for drawing in a virtual space.

FIG. 19 shows an arrangement example of elements necessary for drawing in the virtual space, in a case where only one camera image is used, that is, only the camera image captured by the center rear image capturing unit 103 is used. Furthermore, FIG. 20 shows an arrangement example of elements necessary for drawing in a virtual space in a case where multiple camera images are used. Note that the illustrated example shows a case of using three of the center rear image capturing unit 103, the right-side rear image capturing unit 103R, and the left-side rear image capturing unit 103L.

As described above, in a case where multiple cameras are used, the camera images individually captured are composed to be used on a cylindrical camera image compositing surface centered on the virtual video image display unit 107A. By composing the camera image into a cylindrical shape, image processing can be performed so that joints of the camera images are inconspicuous. At this time, by also arranging the center rear image capturing unit 103, the right-side rear image capturing unit 103R, and the left-side rear image capturing unit 103L that are actually installed in the vehicle 10 such that each camera optical axis passes through the center of the virtual video image display unit 107A as shown in FIG. 20, a more natural image can be obtained with a small amount of correction when composing camera images.

Figure 21:
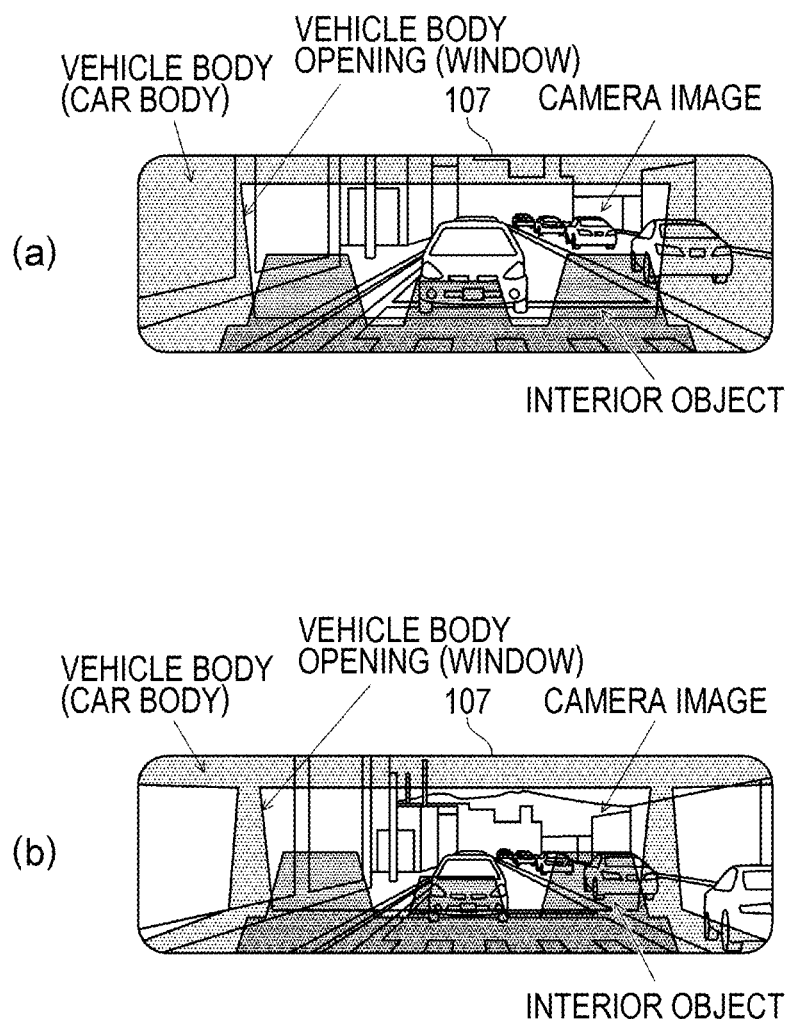
FIG. 21 is a view showing an example of a display image obtained by an image drawing unit.

The projection computing unit 117 converts an object in the virtual space into a projection image, with the virtual video image display unit 107A as a projection surface. The image drawing unit 118 performs processing for drawing details of the camera image and the 3D CG data on the projection image obtained by the projection computing unit 117. The image drawing unit 118 further performs enlargement/reduction processing for matching a size of an image to a size of the video image display unit 107, to output a display image to be supplied to the video image display unit 107. FIGS. 21(*a*) and 21(*b*) show an example of a display image obtained by the image drawing unit 118. FIG. 21(*b*) shows an example of a case where a display size of the reference visual field is larger than that in FIG. 21(*a*).

A setting of the reference visual field will be described. As setting points of the reference visual field, there can be considered (1) Display position, (2) Display size, (3) Entire horizontal compression (curvature), (4) Compression of only horizontal end portion, (5) Entire vertical compression (curvature), (6) Compression (curvature) of only vertical end portion, and the like. While various possible setting methods are considered for each, here, a setting method using a button operation is described for (1) and (2), and a setting method using a touch panel operation on the video image display unit 107 is described for (3) to (6), as an example.

First, an example of an operation method for (1) Display position will be described. In this case, as shown in FIG. 22(*a*), for example, the driver (the user) changes a display position by using up/down/left/right buttons. When the driver presses the up/down/left/right buttons, the reference virtual viewpoint position moves in opposite directions of up/down/left/right. For example, when the driver presses the left button, as shown in FIG. 22(*b*), the virtual reference viewpoint value moves to the right, which is the opposite direction, and the position of the virtual video image display unit is fixed. Therefore, a direction of the view frustum changes to the left, and an image range displayed on the video image display unit 107 moves to the left side.

Next, an example of an operation method for (2) Display size will be described. In this case, as shown in FIG. 23(*a*), for example, the driver (the user) changes a display position by using "+" and "−" buttons. When the driver presses the "+" and "−" buttons, the reference virtual viewpoint position moves in the front-back direction. For example, when the driver presses the "+" button, the virtual reference viewpoint value approaches the virtual video image display unit as shown in FIG. 23(*b*), and the position of the virtual video image display unit is fixed. Therefore, a view angle of the view frustum is expanded, and a displayed range (a display size) becomes large.

Figure 24:
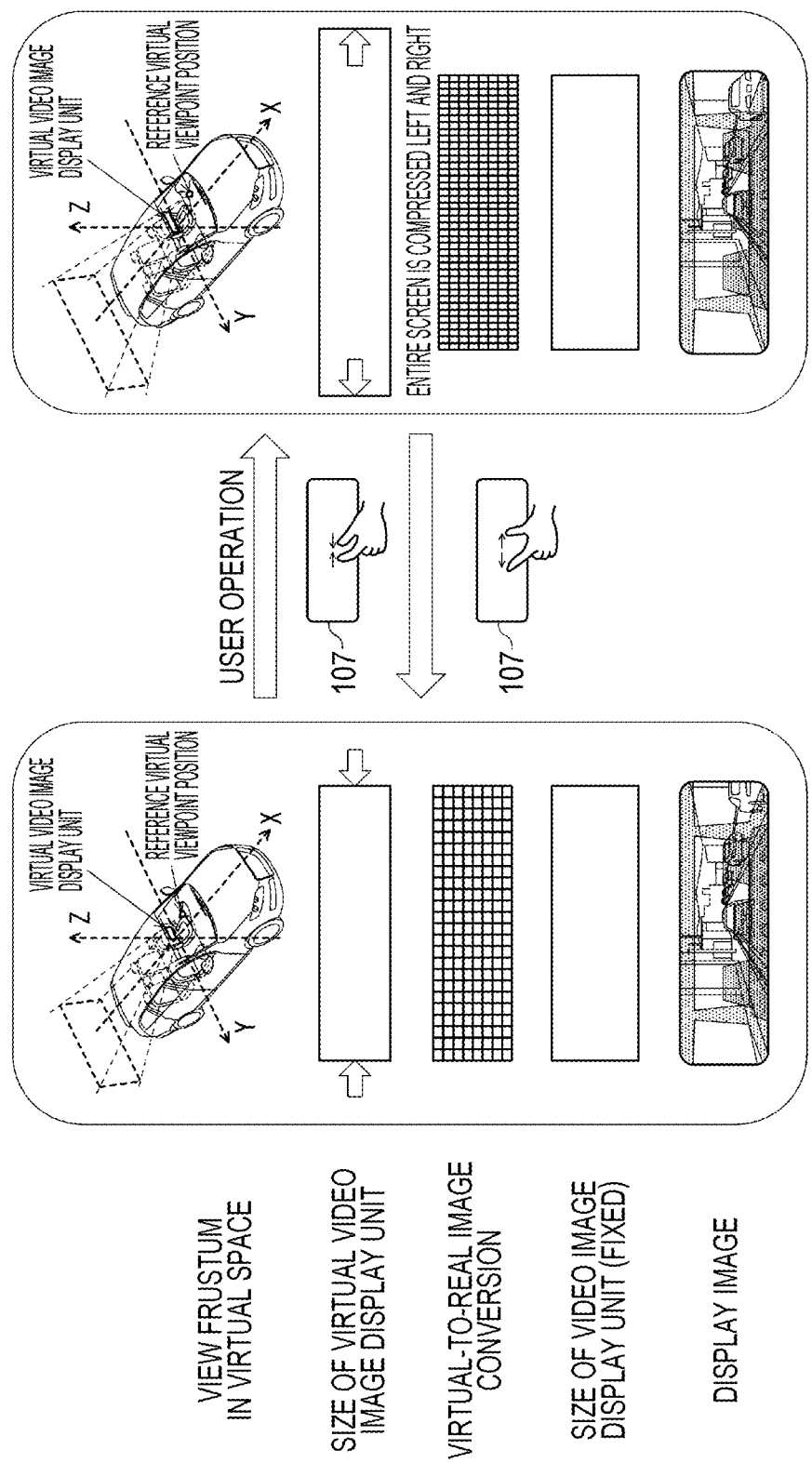
FIG. 24 is a view for explaining an example of an operation method of compression (curvature) in the entire horizontal direction, in the reference visual field setting.

Next, an example of an operation method of (3) Entire horizontal compression (curvature) will be described. FIG. 24 shows this operation method. When the driver (the user) performs a pinch-in operation to the left and right near the center of the screen, a size of the virtual video image display unit in the horizontal direction expands in accordance with a size of the pinch-in operation. At this time, since the reference virtual viewpoint position is fixed, the view frustum becomes large in the entire horizontal direction. Since a size of the actual video image display unit (the video image display unit 107) is fixed, virtual-to-real image conversion is a conversion that is compressed entirely in the left-right direction, and the display image displayed on the actual video image display unit 107 is compressed in the left-right direction.

Conversely, in a case where the driver performs a pinch-out operation to the left and right near the center of the screen, the view frustum becomes smaller in the horizontal direction, and a compression ratio of the display image displayed on the actual video image display unit 107 in the left-right direction becomes smaller. By such adjustment of the pinch-in and pinch-out operations, a compression ratio in the left-right direction of the entire screen (corresponding to a curvature of the entire left-right direction of the real mirror) is adjusted.

Figure 25:
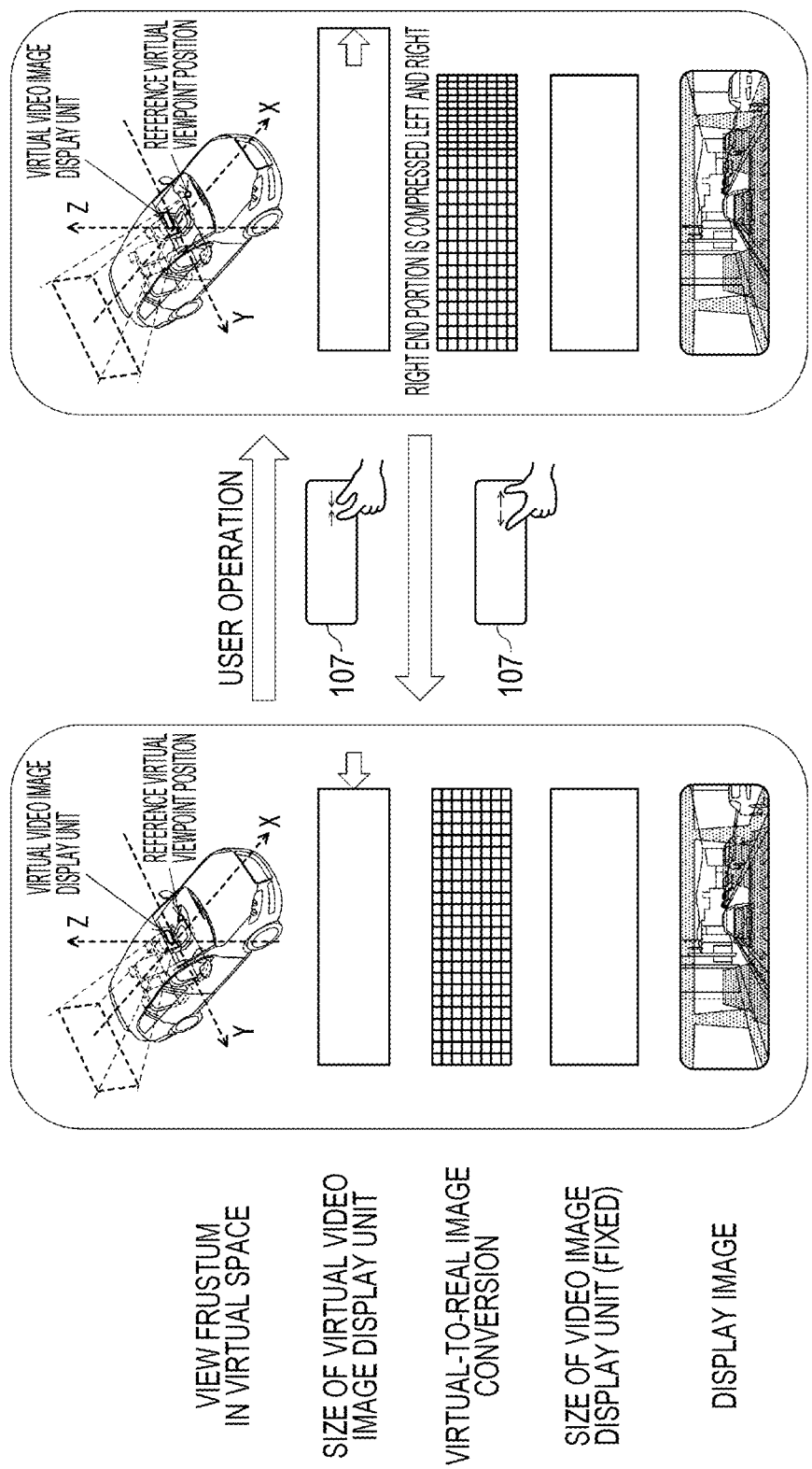
FIG. 25 is a view for explaining an example of an operation method of compression (curvature) only at a horizontal end portion, in the reference visual field setting.

Next, an example of an operation method of (4) Compression (curvature) of only horizontal end portion will be described. FIG. 25 shows this operation method. When the driver (the user) performs a pinch-in operation to the left and right near a right end portion of the screen, a size of the virtual video image display unit in a right direction expands in accordance with a size of the pinch-in operation. At this time, since the reference virtual viewpoint position is fixed, the view frustum increases in the right direction. Since a size of the actual video image display unit (the video image display unit 107) is fixed, virtual-to-real image conversion is a conversion that is compression in the left-right direction at the right end portion, and a display image displayed on the video image display unit 107 is compressed in the left-right direction at the right end portion.

Conversely, in a case where the driver performs a pinch-out operation to the left and right near the center of the screen, a size of the virtual video image display unit in the right direction becomes smaller, and a size of a viewing platform in the right direction becomes smaller. By such adjustment of the pinch-in and pinch-out operations, a compression ratio in the left-right direction of the right end portion of the screen (corresponding to a curvature of the right end portion of the real mirror) is adjusted. Note that, although detailed description is omitted, a compression ratio in the left-right direction at a left end portion can be similarly adjusted. Furthermore, when adjusting the compression ratio in the left-right direction of the right end portion or the left end portion, it is also conceivable to adjust both compression ratios at the same time.

Figure 26:
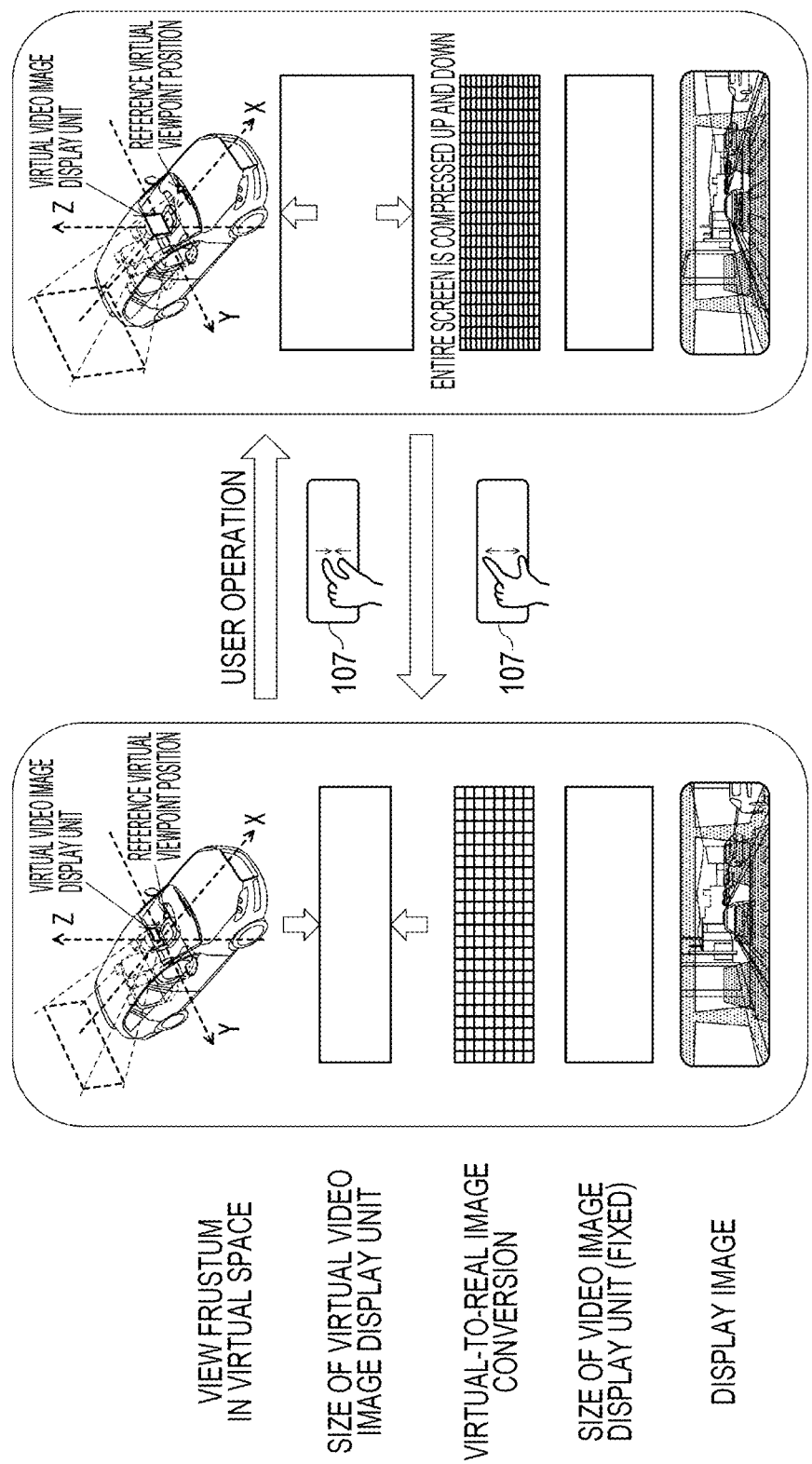
FIG. 26 is a view for explaining an example of an operation method of compression (curvature) in the entire vertical direction, in the reference visual field setting.

Next, an example of an operation method of (5) Entire vertical compression (curvature) will be described. FIG. 26 shows this operation method. When the driver (the user) performs a pinch-in operation to up and down near the center of the screen, a size of the virtual video image display unit in the vertical direction expands in accordance with a size of the pinch-in operation. At this time, since the reference virtual viewpoint position is fixed, the view frustum becomes large in the entire vertical direction. Since a size of the actual video image display unit (the video image display unit 107) is fixed, virtual-to-real image conversion is a conversion that is compressed entirely in the up-down direction, and the display image displayed on the actual video image display unit 107 is compressed in the up-down direction.

Conversely, in a case where the driver performs a pinch-out operation to up and down near the center of the screen, the view frustum becomes smaller in the vertical direction, and a compression ratio of the display image displayed on the actual video image display unit 107 in the up-down direction becomes smaller. By such adjustment of the pinch-in and pinch-out operations, a compression ratio in the up-down direction of the entire screen (corresponding to a curvature of the entire up-down direction of the real mirror) is adjusted.

Figure 27:
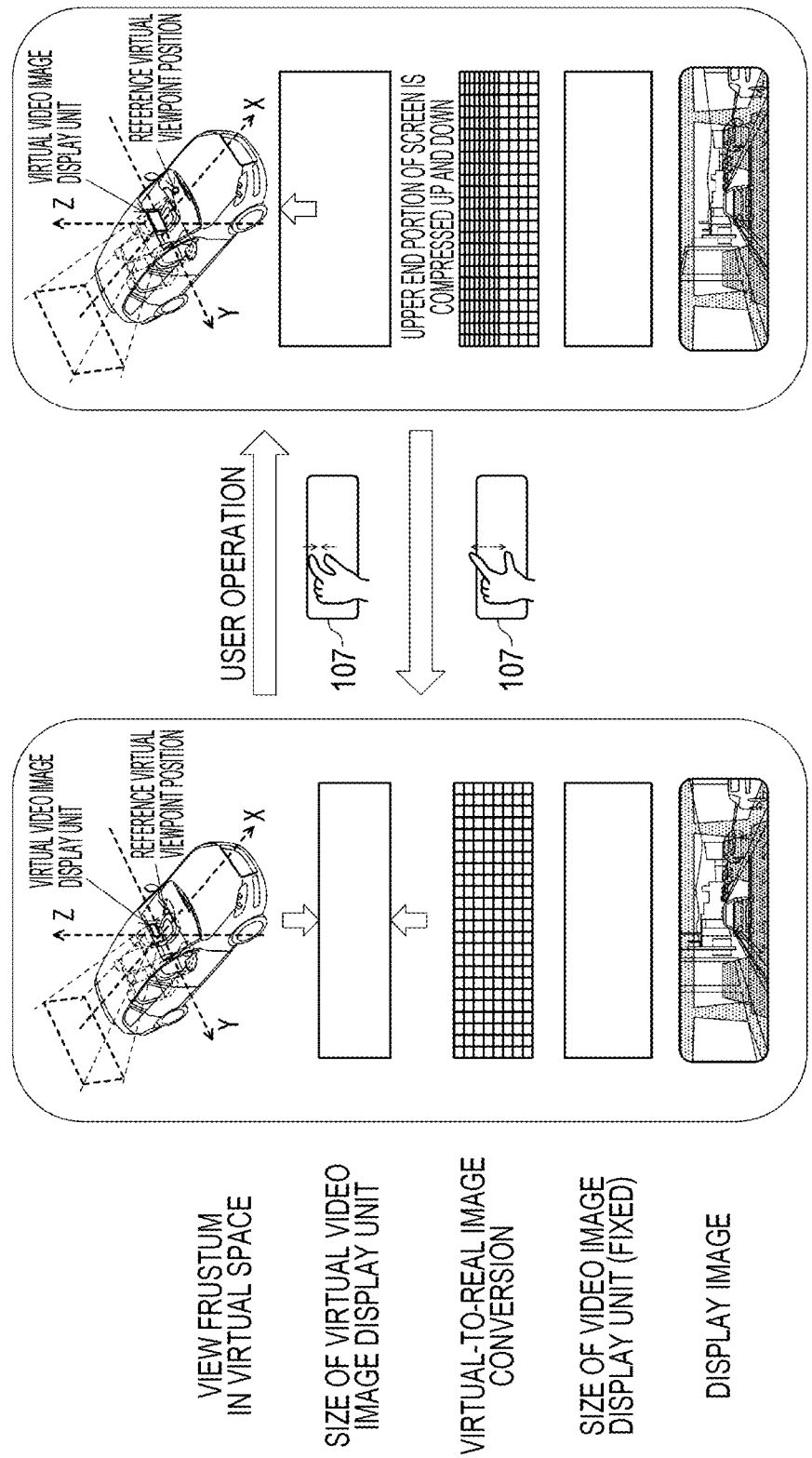
FIG. 27 is a view for explaining an example of an operation method of compression (curvature) only at a vertical end portion, in the reference visual field setting.

Next, an example of an operation method of (6) Compression (curvature) of only vertical end portion will be described. FIG. 27 shows this operation method. When the driver (the user) performs a pinch-in operation to the left and right near an upper end portion of the screen, a size of the virtual video image display unit in an upper direction expands in accordance with a size of the pinch-in operation. At this time, since the reference virtual viewpoint position is fixed, the view frustum increases in the upper direction. Since a size of the actual video image display unit (the video image display unit 107) is fixed, virtual-to-real image conversion is a conversion that is compression in the up-down direction at the upper end portion, and the display image displayed on the actual video image display unit 107 is compressed in the up-down direction at the upper end portion.

Conversely, in a case where the driver performs a pinch-out operation to the left and right near the center of the screen, a size of the virtual video image display unit in the upper direction becomes smaller, and a size of the viewing platform in the upper direction becomes smaller. By such adjustment of the pinch-in and pinch-out operations, a compression ratio in the up-down direction of the upper end portion of the screen (corresponding to a curvature of the right end portion of the real mirror) is adjusted. Note that, although detailed description is omitted, a compression ratio in the up-down direction at a lower end portion can be similarly adjusted. Furthermore, when adjusting the compression ratio of the upper end portion or the lower end portion in the up-down direction, it is also conceivable to adjust both compression ratios at the same time.

Figure 28:
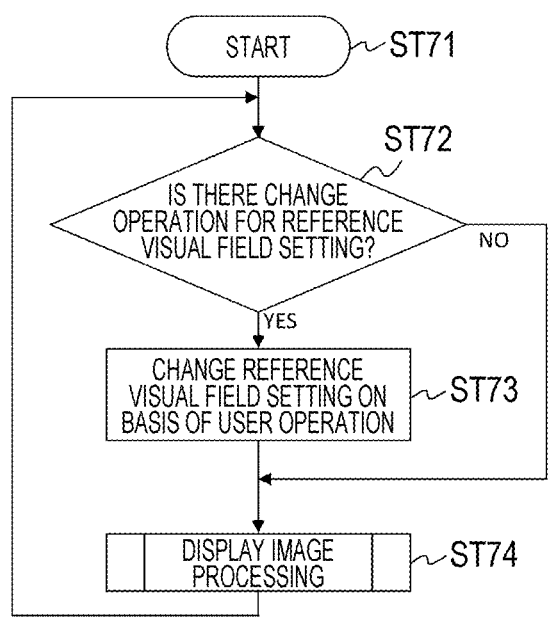
FIG. 28 is a flowchart showing an example of a normal operation flow in the image processing apparatus.

A flowchart of FIG. 28 shows an example of the normal operation flow in the image processing apparatus 109. In step ST71, the image processing apparatus 109 starts processing. Next, in step ST72, the image processing apparatus 109 determines whether or not there is a change operation for the reference visual field setting. When there is a change operation, in step ST73, the image processing apparatus 109 changes the reference visual field setting on the basis of the user operation (see FIGS. 24 to 27).

After the processing of step ST73, the image processing apparatus 109 proceeds to the processing of step ST74. Furthermore, when there is no change operation in step ST72, the image processing apparatus 109 immediately proceeds to the processing of step ST74. In step ST74, the image processing apparatus 109 performs processing for generating a display image to be displayed on the video image display unit 107. After the processing of step ST74, the image processing apparatus 109 returns to step ST72 and repeats similar processing as described above.

Figure 29:
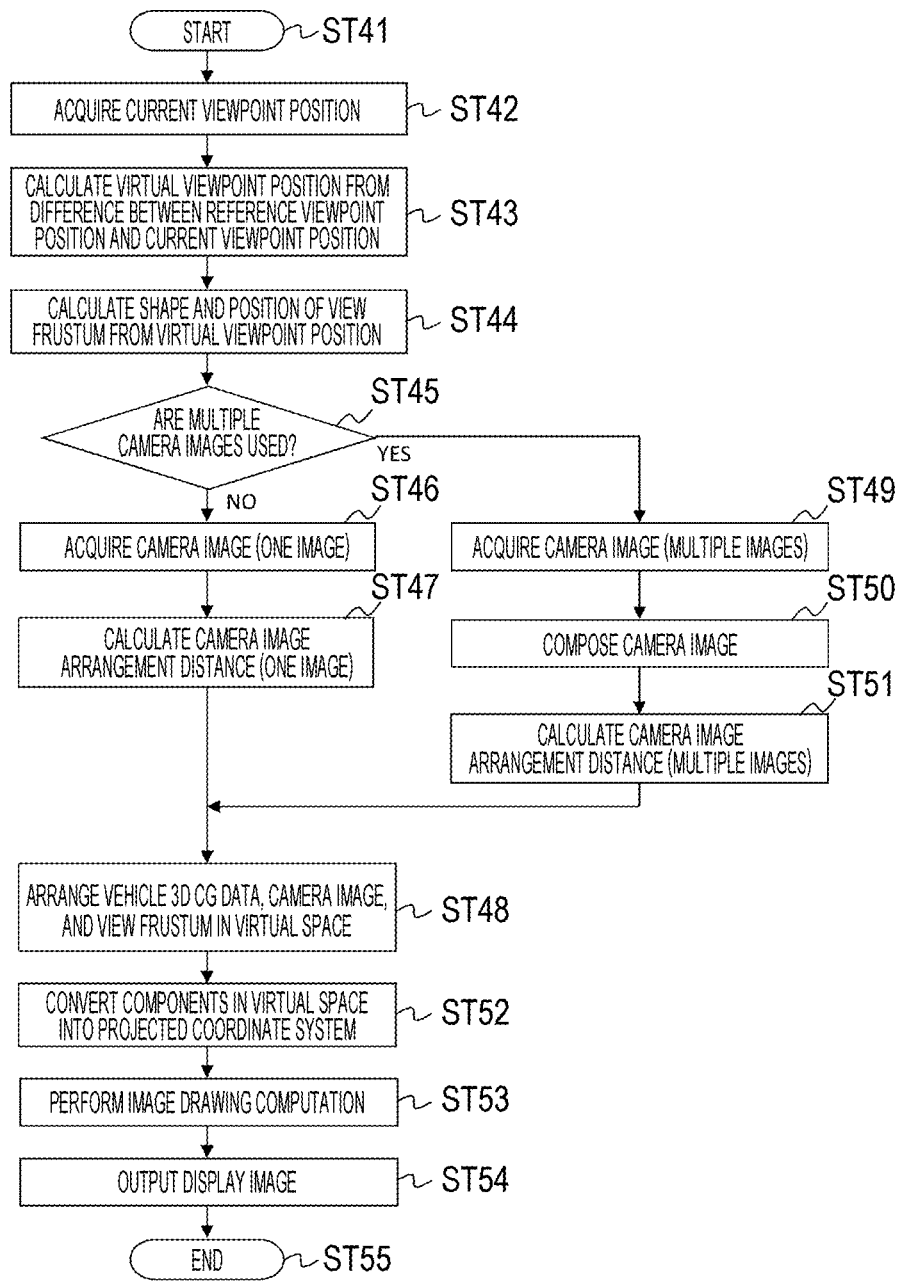
FIG. 29 is a flowchart showing an example of display image processing.

A flowchart of FIG. 29 shows an example of display image processing of step ST74 of FIG. 28. In step ST41, the image processing apparatus 109 starts processing. Next, in step ST42, the image processing apparatus 109 acquires a current viewpoint position on the basis of a detection result of the viewpoint measuring unit 105.

Next, in step ST43, the image processing apparatus 109 converts, a difference between the reference viewpoint position and the current viewpoint position into a difference of the virtual viewpoint from the reference virtual viewpoint position, to calculate a virtual viewpoint position (see FIG. 6). Next, in step ST44, the image processing apparatus 109 calculates a shape and a position of the view frustum from the virtual viewpoint position.

Next, in step ST45, the image processing apparatus 109 determines whether or not multiple camera images are used. Here, the number of camera images used may be one or multiple, and is determined by which camera image region is included in the view frustum part formed by the reference virtual viewpoint position and the virtual video image display unit 107A.

Figure 30:
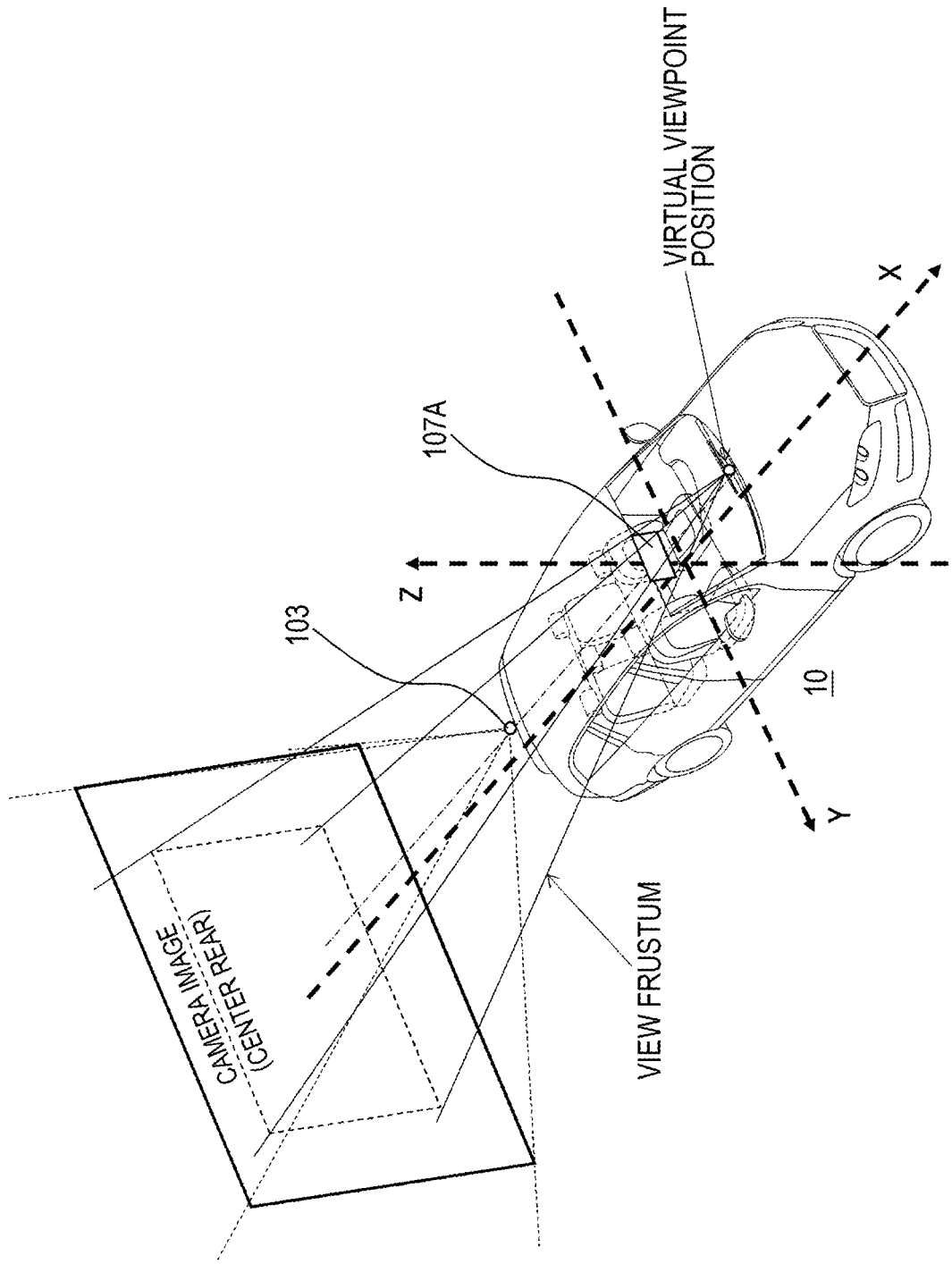
FIG. 30 is a view for explaining a case where one camera image is used.
Figure 31:
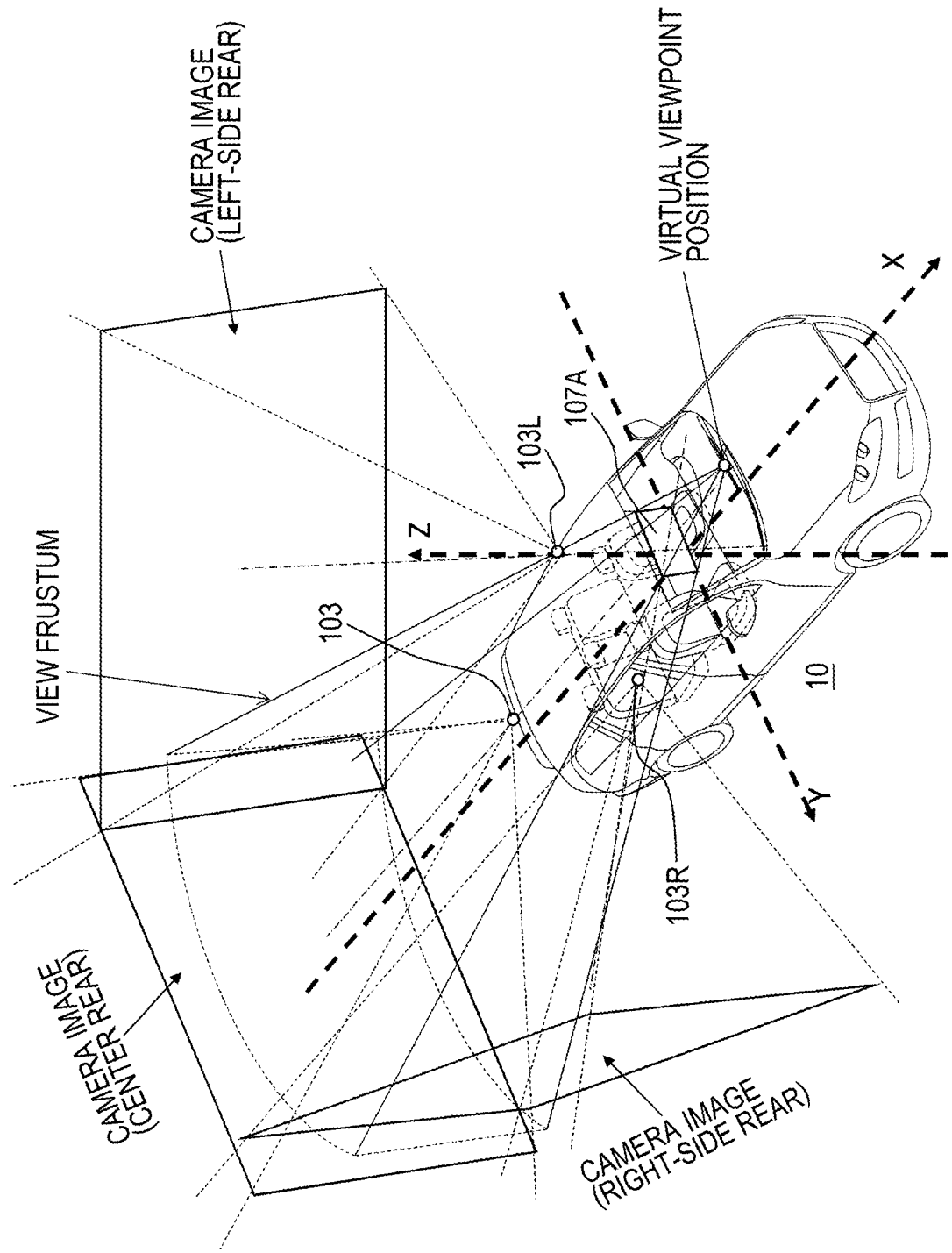
FIG. 31 is a view for explaining a case where multiple camera images are used.

For example, as shown in FIG. 30, in a case where the view frustum fits in only one camera image (a camera image by the center rear image capturing unit 103), only one camera image is used. Furthermore, for example, as shown in FIG. 31, in a case where there is a view frustum across camera images by the three cameras, the center rear image capturing unit 103, the right-side rear image capturing unit 103R, and the left-side rear image capturing unit 103L, three camera images are used. In a similar idea, although not shown, the camera images to be used may be two camera images by the center rear image capturing unit 103 and the right-side rear image capturing unit 103R, or two camera images by the center rear image capturing unit 103 and the left-side rear image capturing unit 103L.

Returning to FIG. 29, when one camera image is used in step ST45, the image processing apparatus 109 acquires the one camera image in step ST46. Next, in step ST47, the image processing apparatus 109 calculates a camera image arrangement distance (see FIG. 17). In this case, a distance image obtained by the center rear distance measuring unit 104 is used to calculate the camera image arrangement distance from a rear part of the vehicle 10 (the center rear distance measuring unit 104). After the processing of step ST47, the image processing apparatus 109 proceeds to the processing of step ST48.

Furthermore, when multiple camera images are used in step ST45, the image processing apparatus 109 acquires the multiple camera images in step ST49. Next, the image processing apparatus 109 composes multiple camera images in step ST50. In this case, mapping is performed on a cylindrical camera image arrangement surface that is centered on the virtual video image display unit 107A and prepared in the virtual space.

Next, in step ST51, the image processing apparatus 109 calculates a camera image arrangement distance (see FIG. 18). In this case, a composite of distance images of multiple rear distance measuring units is used, and the camera image arrangement distance from the virtual video image display unit 107A is calculated. After the processing of step ST51, the image processing apparatus 109 proceeds to the processing of step ST48.

In step ST48, the image processing apparatus 109 arranges, in the virtual space, 3D CG data of the vehicle 10 (a car body, a window, an interior, and the like), a camera image, and a view frustum, which are the elements necessary for drawing (see FIGS. 19 and 20). Next, in step ST52, the image processing apparatus 109 converts components in the virtual space into a projected coordinate system, to obtain a projection image.

Next, in step ST53, the image processing apparatus 109 performs processing for drawing details of the camera image and the 3D CG data on the projection image, to obtain a display image. Next, in step ST54, the image processing apparatus 109 outputs the display image to the video image display unit 107. After the processing in step ST54, the image processing apparatus 109 ends the processing in step ST55.

The image processing apparatus 109 continuously performs processing of the above-described normal operation flow in synchronization with an update frequency of the video image display unit 107, for example, 120 fps. Therefore, in the display image displayed on the video image display unit 107, an overlapping degree of a drawing target object is changed appropriately depending on motion of the viewpoint and a distance between with the body of interest on a rear side, that is, an appropriate motion parallax can be obtained. Then, the driver (the user) can obtain an appropriate sense of distance with respect to the rear camera image.

Figure 32:
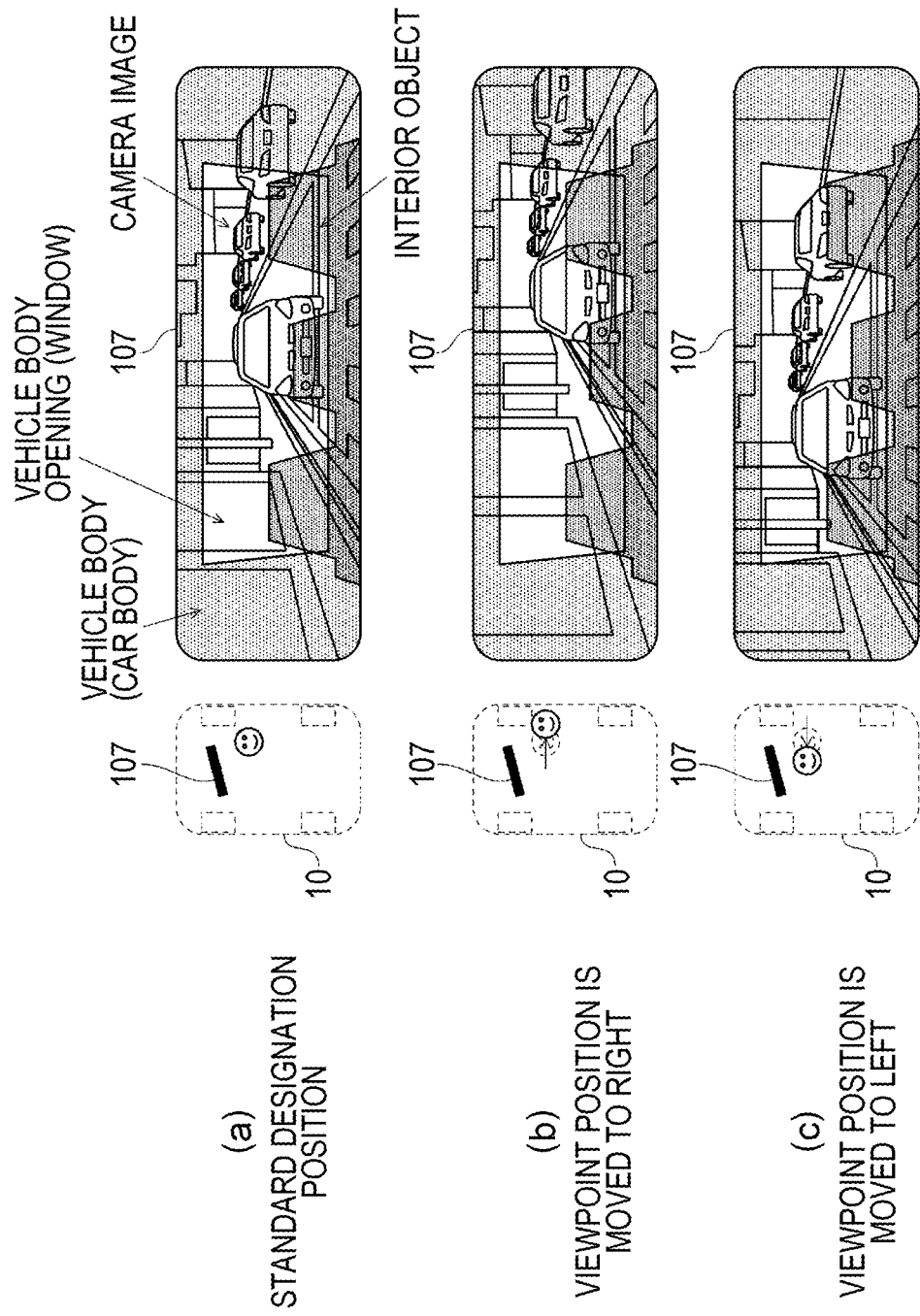
FIG. 32 is a view showing a change in an overlapping degree of drawing object movement due to viewpoint motion.

FIGS. 32(*a*), 32(*b*), and 32(*c*) show an example of the display image displayed on the video image display unit 107. FIG. 32(*a*) shows a case where a viewpoint position of the driver is at a standard viewpoint position, FIG. 32(*b*) shows a case where the viewpoint position of the driver is moved to the right from the standard viewpoint position, and FIG. 32(*c*) shows a case where the viewpoint position of the driver is moved to the left from the standard viewpoint position. It can be seen that an overlapping degree between a vehicle interior CG image and an object (an automobile) in the camera image changes in accordance with the viewpoint position of the driver.

Note that, in real mirrors, interior objects and the vehicle body create a blind spot where the rear side cannot be seen. However, in the present technology, by transparently drawing at a time of drawing, or by hiding a part, it is also possible to maintain a wide rear visual field while assisting perception of a sense of distance by motion parallax. For example, FIG. 33(*a*) is a state where the rear seat as the interior object is hidden. Furthermore, FIG. 33(*b*) shows the vehicle body and the rear seat as the interior object with a low transmittance, and FIG. 33(*c*) shows the vehicle body and the rear seat as the interior object with a high transmittance.

Of course, if the occurrence of blind spots is not a concern, the interior object or the vehicle body may be drawn with transmittance of 0% to generate and display an image like a real mirror.

Figure 33:
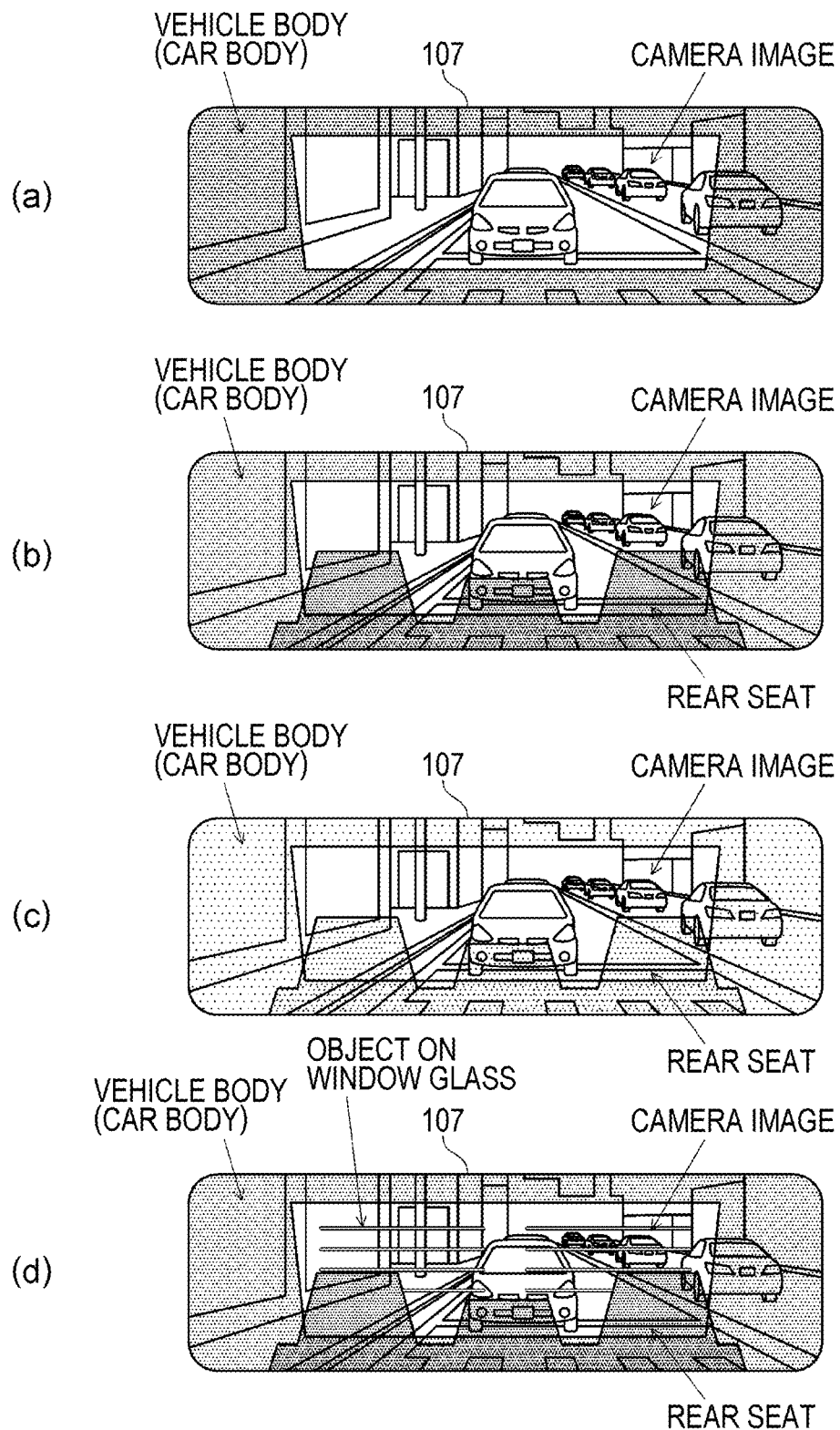
FIG. 33 is a view showing variations in drawing processing.

Furthermore, the interior object is not limited to the sheet or the like, and distance perception can be further emphasized by drawing a pattern on a window glass, for example. FIG. 33(*d*) shows a state where a horizontal line is provided as an object on the window glass.

As described above, in the vehicle 10 shown in FIG. 1, the image processing apparatus 109 shown in FIG. 3 performs the reference visual field setting in accordance with an operation of the user operation unit 108 by the driver (the user). Therefore, it is possible to satisfactorily provide a visual field according to a driving situation or according to a preference of the driver (individual).

Furthermore, in the vehicle 10 shown in FIG. 1, the image processing apparatus 109 shown in FIG. 3 superimposes a vehicle interior image on a camera image obtained by capturing an image on a rear side from the vehicle 10, and obtains a display image to be displayed on the video image display unit 107 that is arranged in place of the conventional room mirror. The display image is not only made from the camera image obtained by capturing an image of a rear side of the vehicle 10, but the display image is obtained by superimposing the vehicle interior image on the camera image. Therefore, it is possible to easily provide a sense of distance by motion parallax.

Furthermore, in the vehicle 10 shown in FIG. 1, the image processing apparatus 109 shown in FIG. 3 changes a superimposed positional relationship between the camera image and the vehicle interior image in accordance with motion of a viewpoint of the driver. Therefore, it is possible to generate motion parallax that is close to that of looking at an actual rearview mirror, and can assist the driver's perception of between distances.

Furthermore, in the vehicle 10 shown in FIG. 1, the image processing apparatus 109 shown in FIG. 3 arranges a camera image and an image showing the vehicle in a three-dimensional space, obtains a virtual viewpoint position that changes in accordance with motion of a viewpoint of the driver, and converts the camera image and the vehicle interior image into a projected coordinate system with a visual field determined by the virtual viewpoint position, to obtain a display image. Therefore, it is possible to accurately change the superimposed positional relationship between the camera image and the vehicle interior image, in accordance with motion of a viewpoint of the driver.

Furthermore, in the vehicle 10 shown in FIG. 1, the image processing apparatus 109 shown in FIG. 3 arranges a camera image at a position of a body of interest (an object) existing on a rear side from the vehicle 10, to obtain a display image. Therefore, the body of interest can be arranged with a proper size at a proper position in the three-dimensional space, and motion parallax that occurs between the body and the vehicle interior image can be correctly expressed.

Note that the effects described in this specification are merely examples and are not limited, and additional effects may be present.

Electronic mirrors for vehicles have an advantage of being able to provide a rear visual field that is not affected by loading of luggage and has fewer blind spots as compared to actual mirrors. However, the electronic mirror has a problem that it is difficult to intuitively perceive a sense of distance. Examples of important elements for a human to perceive a distance include binocular parallax, convergence angle, adjustment, and motion parallax.

Among these, motion parallax is a phenomenon in which two or more bodies with different distances appear and disappear in response to motion of a viewpoint. It is considered that, by only causing motion of a display portion of a camera image as in the technique described in Patent Document 1 described above, a change in appearance and disappearance is insufficient, and an effect of presenting a sense of distance with motion parallax is very weak. The present technology can provide an electronic mirror that positively provides a sense of distance with motion parallax by superimposing and drawing objects in a vehicle interior on a rear camera image, and adding motion parallax to them, and that is intuitive and familiar with a driver (a user).

2. Modified Example

Note that, the above-described embodiment has shown an example in which the driver (the user) sets the reference visual field from the user operation unit 108, generates a display image on the basis of the setting information, and displays on the video image display unit 107 corresponding to the room mirror.

Considering an actual use case, it is also assumed that some display modes (reference visual field settings) are held in advance and used by switching in accordance with a driver's preference, a vehicle type, and a driving situation. Here, a method of switching among (1) to (4) below will be described. Note that, this example shows switching among four modes, but the number of display modes to be held is variable as needed.

(1) Plane mirror (standard display)
(2) Curved mirror (display with curvature in horizontal direction of screen)
(3) Right-end curved mirror (display with curvature at right end portion of screen)
(4) Left-end curved mirror (display with curvature at left end portion of screen)

Figure 34:
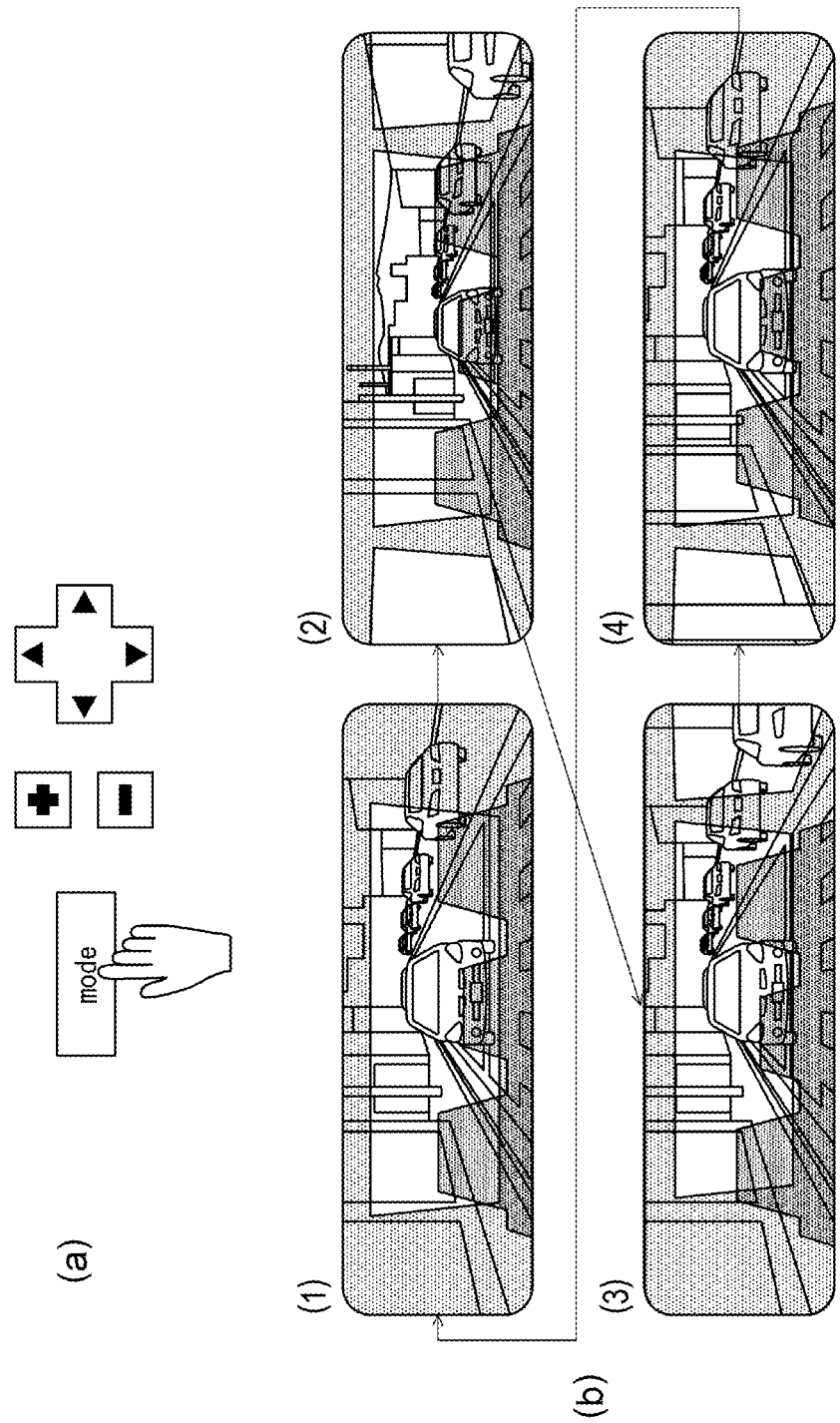
FIG. 34 is a view for explaining an example of toggling a display mode (the reference visual field setting).

As an operation method for switching the display mode, various realization methods can be considered, such as switching by a menu, and switching according to a driving operation or a driving condition of the vehicle. Here, as shown in FIG. 34(a), each time the mode button is pressed, the display modes (1) to (4) prepared in advance can be toggled to be used. FIG. 34(b) shows an example of a display image that is on the video image display unit 107 and can be toggled corresponding to the display modes (1) to (4).

Note that, in this example, the display mode is switched by the button operation, but a method of automatically providing an appropriate display mode according to a driving operation such as a traveling speed, a turn signal, and a steering wheel operation, and a method of automatically providing an appropriate display mode on the basis of a location in conjunction with a navigation device are also conceivable.

Furthermore, the series of processing in the image processing apparatus 109 described above can be executed by hardware or also executed by software. In a case where the series of processing is performed by software, a program that configures the software is installed in a computer. Here, examples of the computer include, for example, a computer that is built in dedicated hardware, a general-purpose personal computer that can perform various functions by being installed with various programs, and the like.

Figure 35:
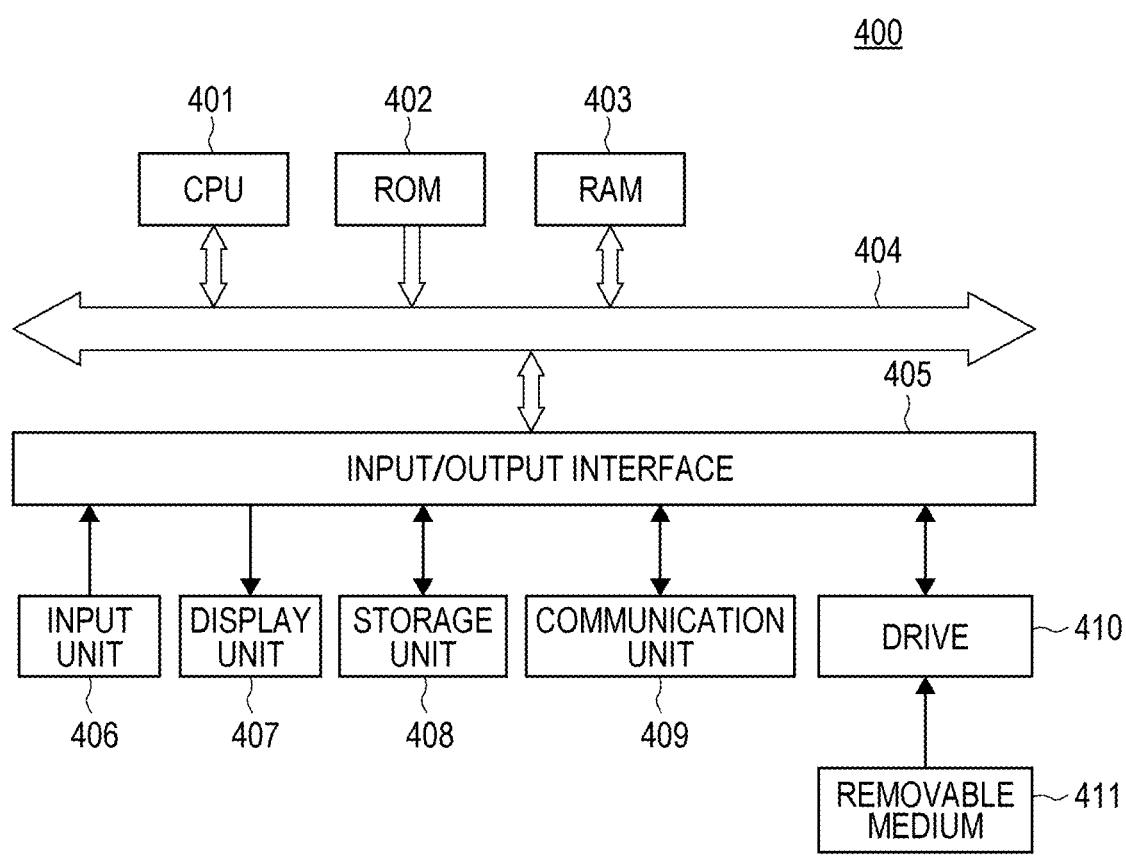
FIG. 35 is a block diagram showing a configuration example of hardware of a computer.

FIG. 35 is a block diagram showing a configuration example of hardware of a computer 400 that executes the series of processing described above in accordance with a program.

In the computer 400, a central processing unit (CPU) 401, a read only memory (ROM) 402, and a random access memory (RAM) 403 are mutually connected by a bus 404.

The bus 404 is further connected with an input/output interface 405. To the input/output interface 405, an input unit 406, an output unit 407, a recording unit 408, a communication unit 409, and a drive 410 are connected.

The input unit 406 includes an input switch, a button, a microphone, an image sensor, and the like. The output unit 407 includes a display, a speaker, and the like. The recording unit 408 includes a hard disk, a non-volatile memory, and the like. The communication unit 409 includes a network interface or the like. The drive 410 drives a removable medium 411 such as a magnetic disk, an optical disk, a magneto-optical disk, or a semiconductor memory.

In the computer 400 configured as described above, the series of processing described above is performed, for example, by the CPU 401 loading the program recorded in the recording unit 408 into the RAM 403 via the input/output interface 405 and the bus 404, and executing.

The program executed by the computer 400 (the CPU 401) can be provided by being recorded on, for example, the removable medium 411 as a package medium or the like. Furthermore, the program can be provided via a wired or wireless transmission medium such as a local area network, the Internet, or digital satellite broadcasting.

In the computer, by attaching the removable medium 411 to the drive 410, the program can be installed in the recording unit 408 via the input/output interface 405. Furthermore, the program can be received by the communication unit 409 via a wired or wireless transmission medium, and installed in the recording unit 408. Besides, the program can be installed in advance in the ROM 402 and the recording unit 408.

Note that the program executed by the computer may be a program that performs processing in a time series according to an order described in this specification, or may be a program that performs processing in parallel or at necessary timing such as when a call is made.

Furthermore, although the preferred embodiment of the present disclosure has been described above in detail with reference to the accompanying drawings, the technical scope of the present disclosure is not limited to such an example. It is obvious that those with ordinary skill in the technical field of the present disclosure can arrive various variations or modifications within the scope of the technical idea described in the claims, and it is naturally understood that these also fall within the technical scope of the present disclosure.

Furthermore, the present technology can also have the following configurations.

(1) An image processing apparatus including:
a processing unit configured to generate a display image by superimposing a vehicle interior image on a captured image obtained by capturing an image on a rear side from a vehicle, in which
the above-described processing unit generates the above-described display image on the basis of setting information regarding a reference visual field, and
the image processing apparatus further includes:
a setting unit configured to set the above-described reference visual field.

(2) The image processing apparatus according to (1) above, in which
as the above-described reference visual field setting, a display position setting is included.

(3) The image processing apparatus according to (1) or (2) above, in which
as the above-described reference visual field setting, a display size setting is included.

(4) The image processing apparatus according to any one of (1) to (3) above, in which
as the above-described reference visual field setting, a compression setting of all or part in a horizontal direction is included.

(5) The image processing apparatus according to any one of (1) to (4) above, in which
as the above-described reference visual field setting, a compression setting of all or part in a vertical direction is included.

(6) The image processing apparatus according to any one of (1) to (5) above, in which
the above-described processing unit uses, as a captured image obtained by capturing an image on a rear side from the above-described vehicle, a captured image captured by an image capturing device attached to a rear part of the above-described vehicle and a captured image captured by an image capturing device attached to a side part of the above-described vehicle.

(7) The image processing apparatus according to any one of (1) to (6) above, further including:
a selection unit configured to select any reference visual field setting from a plurality of the above-described reference visual field settings, in which
the above-described processing unit generates the above-described display image on the basis of the above-described selected reference visual field setting.

(8) The image processing apparatus according to any one of (1) to (7) above, in which
the above-described vehicle interior image is a computer graphics image.

(9) The image processing apparatus according to any one of (1) to (8) above, in which
the above-described processing unit changes a superimposed positional relationship between the above-described captured image and the above-described vehicle interior image in accordance with motion of a viewpoint of a driver.

(10) The image processing apparatus according to (9) above, in which
the above-described processing unit
arranges the above-described captured image and the above-described vehicle interior image in a three-dimensional space, and
obtains a virtual viewpoint position that changes in accordance with motion of a viewpoint of the above-described driver and converts the above-described captured image and the above-described vehicle interior image into a projected coordinate system with a visual field determined by the virtual viewpoint position, to obtain the above-described display image.

(11) The image processing apparatus according to (10) above, in which
the above-described processing unit arranges the above-described captured image at a position of a predetermined object existing on a rear side from the above-described vehicle.

(12) The image processing apparatus according to (11) above, in which
the above-described predetermined object is an object closest to the above-described vehicle.

(13) The image processing apparatus according to (11) above, in which
the predetermined object is an object being seen by the above-described driver.

(14) The image processing apparatus according to any one of (10) to (13) above, in which
the above-described processing unit obtains a virtual viewpoint position that changes in accordance with motion of a viewpoint of the above-described driver, on the basis of a reference viewpoint position and a reference virtual viewpoint position that are registered for each driver.

(15) The image processing apparatus according to any one of (1) to (14) above, in which
the above-described processing unit superimposes the above-described vehicle interior image on the above-described captured image to allow the captured image to be seen through.

(16) An image processing method including:
a procedure for generating a display image by superimposing a vehicle interior image on a captured image obtained by capturing an image on a rear side from a vehicle, in which
in the procedure for generating the above-described display image, the above-described display image is generated on the basis of setting information regarding a reference visual field, and
the image processing method further includes:
a procedure for setting the above-described reference visual field.

(17) An image processing system including:
an image capturing unit configured to capture an image on a rear side from a vehicle; and
a processing unit configured to generate a display image by superimposing a vehicle interior image on a captured image obtained by capturing an image on a rear side from the vehicle, in which
the above-described processing unit generates the display image on the basis of setting information regarding a reference visual field, and the image processing system further includes:
a setting unit configured to set the above-described reference visual field; and
a display unit configured to display the display image generated by the above-described processing unit.

(18) A program for causing a computer to execute an image processing method including:
a procedure for generating a display image by superimposing a vehicle interior image on a captured image obtained by capturing an image on a rear side from a vehicle, in which
in the procedure for generating the above-described display image, the above-described display image is generated on the basis of setting information regarding a reference visual field, and
the image processing method further includes:
a procedure for setting the above-described reference visual field.

REFERENCE SIGNS LIST

10 Vehicle
100 Vehicle body (car body)
101 Vehicle body opening (window)
102 Interior object
103 Center rear image capturing unit
103R Right-side rear image capturing unit
103L Left-side rear image capturing unit
104 Center rear distance measuring unit
104R Right-side rear distance measuring unit
104L Left-side rear distance measuring unit
105 Viewpoint measuring unit
106 Line-of-sight measuring unit
107 Video image display unit
107A Virtual video image display unit
108 User operation unit
109 Image processing apparatus
111 Storage unit
112 View frustum shape arrangement computing unit
113 Body history storage unit
115 Camera image arrangement computing unit
116 Virtual space arrangement computing unit
117 Projection computing unit
118 Image drawing unit

The invention claimed is:

1. An image processing apparatus comprising:
circuitry configured to
generate a display image by superimposing a vehicle interior image on a captured image obtained by capturing an image on a rear side from a vehicle,
wherein the circuitry generates the display image on a basis of setting information regarding a reference visual field;
set the reference visual field;
arrange the captured image and the vehicle interior image in a three-dimensional space;
arrange the captured image at an arrangement position on a rear side from the vehicle;
obtain a virtual viewpoint position that changes in accordance with motion of a viewpoint of a driver; and
convert the captured image and the vehicle interior image into a projected coordinate system with a visual field determined by the virtual viewpoint position, to obtain the display image,
wherein the arrangement position is a position of a predetermined object existing on a rear side from the vehicle.

2. The image processing apparatus according to claim 1, wherein
as the reference visual field setting, a display position setting is included.

3. The image processing apparatus according to claim 1, wherein
as the reference visual field setting, a display size setting is included.

4. The image processing apparatus according to claim 1, wherein
as the reference visual field setting, a compression setting of all or part of the display image in a horizontal direction is included.

5. The image processing apparatus according to claim 1, wherein
as the reference visual field setting, a compression setting of all or part of the display image in a vertical direction is included.

6. The image processing apparatus according to claim 1, wherein
the circuitry is further configured to
use, as a captured image obtained by capturing an image on a rear side from the vehicle, a captured image captured by an image capturing device attached to a rear part of the vehicle and a captured image captured by an image capturing device attached to a side part of the vehicle.

7. The image processing apparatus according to claim 1, wherein
the circuitry is further configured to
select any reference visual field setting from a plurality of the reference visual field settings; and
generate the display image on a basis of the selected reference visual field setting.

8. The image processing apparatus according to claim 1, wherein
the vehicle interior image includes a computer graphics image.

9. The image processing apparatus according to claim 1, wherein
the circuitry is further configured to
change a superimposed positional relationship between the captured image and the vehicle interior image in accordance with motion of a viewpoint of a driver.

10. The image processing apparatus according to claim 1, wherein the predetermined object includes an object closest to the vehicle.

11. The image processing apparatus according to claim 1, wherein the predetermined object includes an object being seen by the driver.

12. The image processing apparatus according to claim 1, wherein
the circuitry is further configured to
superimpose the vehicle interior image on the captured image to allow the captured image to be seen through.

13. An image processing method comprising:
generating a display image by superimposing a vehicle interior image on a captured image obtained by capturing an image on a rear side from a vehicle, wherein
in the procedure for generating the display image, the display image is generated on a basis of setting information regarding a reference visual field, and
the image processing method further comprises:
setting the reference visual field is further provided;
arranging the captured image and the vehicle interior image in a three-dimensional space;

arranging the captured image at an arrangement position on a rear side from the vehicle;

obtaining a virtual viewpoint position that changes in accordance with motion of a viewpoint of a driver; and converting the captured image and the vehicle interior image into a projected coordinate system with a visual field determined by the virtual viewpoint position, to obtain the display image, wherein the arrangement position is a position of a predetermined object existing on a rear side from the vehicle.

14. An image processing system comprising:

image capturing circuitry configured to capture an image on a rear side from a vehicle; and processing circuitry configured to generate a display image by superimposing a vehicle interior image on a captured image obtained by capturing an image on a rear side from the vehicle, wherein the processing circuitry generates the display image on a basis of setting information regarding a reference visual field, and the image processing system further comprises:

setting circuitry configured to set the reference visual field; and display circuitry configured to display a display image generated by the processing circuitry; wherein the processing circuitry is further configured to arrange the captured image and the vehicle interior image in a three-dimensional space;

arrange the captured image at an arrangement position on a rear side from the vehicle;

obtain a virtual viewpoint position that changes in accordance with motion of a viewpoint of a driver; and convert the captured image and the vehicle interior image into a projected coordinate system with a visual field determined by the virtual viewpoint position, to obtain the display image, wherein the arrangement predetermined position is a position of a predetermined object existing on a rear side from the vehicle.

* * * * *